United States Patent
Wu et al.

(10) Patent No.: US 6,748,140 B1
(45) Date of Patent: Jun. 8, 2004

(54) METHOD, SYSTEM AND APPARATUS FOR CHROMATIC DISPERSION COMPENSATION UTILIZING A GIRES-TOURNOIS INTERFEROMETER

(75) Inventors: Shudong Wu, Fremont, CA (US); Simon X. F. Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 72 days.

(21) Appl. No.: 10/271,418

(22) Filed: Oct. 15, 2002

Related U.S. Application Data

(63) Continuation of application No. 09/718,644, filed on Nov. 22, 2000, now Pat. No. 6,487,342.

(51) Int. Cl.[7] .................................................. G02B 6/26
(52) U.S. Cl. ........................... 385/39; 385/33; 385/23; 385/36; 385/24; 398/152
(58) Field of Search .............................. 385/39, 24, 23, 385/33, 37, 11, 31, 36; 398/152, 115, 122; 356/352, 519, 345

(56) References Cited

U.S. PATENT DOCUMENTS

| | | | | |
|---|---|---|---|---|
| 4,558,950 | A | 12/1985 | Ulrich et al. | 356/345 |
| 5,557,468 | A | 9/1996 | Ip | 359/615 |
| 6,081,379 | A | 6/2000 | Austin et al. | 359/584 |
| 6,130,971 | A * | 10/2000 | Cao | 385/31 |
| 6,169,604 | B1 * | 1/2001 | Cao | 356/519 |
| 6,205,270 | B1 * | 3/2001 | Cao | 385/24 |
| 6,215,926 | B1 * | 4/2001 | Cao | 385/36 |
| 6,263,129 | B1 * | 7/2001 | Cao | 385/24 |
| 6,310,690 | B1 * | 10/2001 | Cao et al. | 356/519 |
| 6,356,684 | B1 | 3/2002 | Patterson et al. | 385/37 |
| 6,393,176 | B1 * | 5/2002 | Cao | 385/24 |
| 6,487,342 | B1 * | 11/2002 | Wu et al. | 385/39 |
| 6,519,065 | B1 | 2/2003 | Colbourne et al. | 359/161 |

OTHER PUBLICATIONS

Cimini, Leonard.J., Jr. et al., "Optical Equalization to Combat the Effects of Laser Chirp and Fiber Dispersion," Journal of Lightwave Technology, May 1990, vol. 8, No. 5, pp. 649–659.

Cimini, Leonard J., Jr. et al., "Optical Equalization for High–Bit–Rate Fiber–Optic Communications," IEEE Photonics Technology Letters, vol. 2, No. 3, Mar. 1990, pp. 200–202.

Eldering, Charles A. et al., "Etalon Time Response Limitations as Calculated from Frequency Analysis," Optical Engineering, Mar. 1993, vol. 32, No. 3, pp. 464–468.

Gnauck, A.H., et al., "Optical Equalization of Fiber Chromatic Dispersion in a 5–Gb/s Transmission System," IEEE Photonics Technology Letters, Aug. 1990, vol. 2, No. 8, pp. 585–587.

Jacobson, J.M. et al., "Femtosecond Pulse Generation in a Ti:AI$_2$ O$_3$ Laser by Using Second–and Third–Order Intracavity Dispersion," Optics Letters, vol. 17, No. 22, Nov. 15, 1992, pp. 1608–1610.

(List continued on next page.)

Primary Examiner—Phan T. H. Palmer
(74) Attorney, Agent, or Firm—Sawyer Law Group LLP

(57) ABSTRACT

A method for compensating for chromatic dispersion of an optical signal includes: receiving the optical signal from an input fiber; collimating the optical signal using a collimator; delivering the collimated optical signal to a Gires-Tournois interferometer; reflecting a chromatic-dispersion-compensated optical signal from the Gires-Tournois interferometer to the collimator; focusing the chromatic-dispersion compensated optical signal into an output fiber. The compensator in accordance with the present invention provides flexibility in producing periodically varying chromatic dispersion so as to compensate for unwanted periodic chromatic dispersion produced in an interferometric interleaved channel separator. Also, the compensator enables compensation of fiber optic chromatic dispersion.

22 Claims, 22 Drawing Sheets

OTHER PUBLICATIONS

Kuhl, Jürgen et al., "Compression of Femtosecond Optical Pulses with Dielectric Multilayer Interfeormeters," IEEE Transactions of Quantum Electronics, vol. QE–22, No. 1, Jan. 1986, pp. 182–185.

Li, Kathryn D. et al., "Broadband Cubic–Phase Compensation with Resonant Gires–Tournois Interferometer," Optical Society of America, May 1, 1989, vol. 14, No. 9, pp. 450–452.

Zhang, Nai et al., "Compression of Picosecond Optical Pulses from a Strongly RF Modulated InGaAsP DBR Diode Laser Using a Gires–Tournois Interferometer," Electronics and Communication in Japan, Part 2, vol. 71, No. 12, Feb. 1988, pp. 100–106.

Zhao, W. et al., "Compression of Nonlinearly Chirped Pulses Using Gires–Tournois Interferometers," Appl. Phys. Lett., vol. 50, No. 19, May 11, 1987, pp. 1304–1306.

* cited by examiner

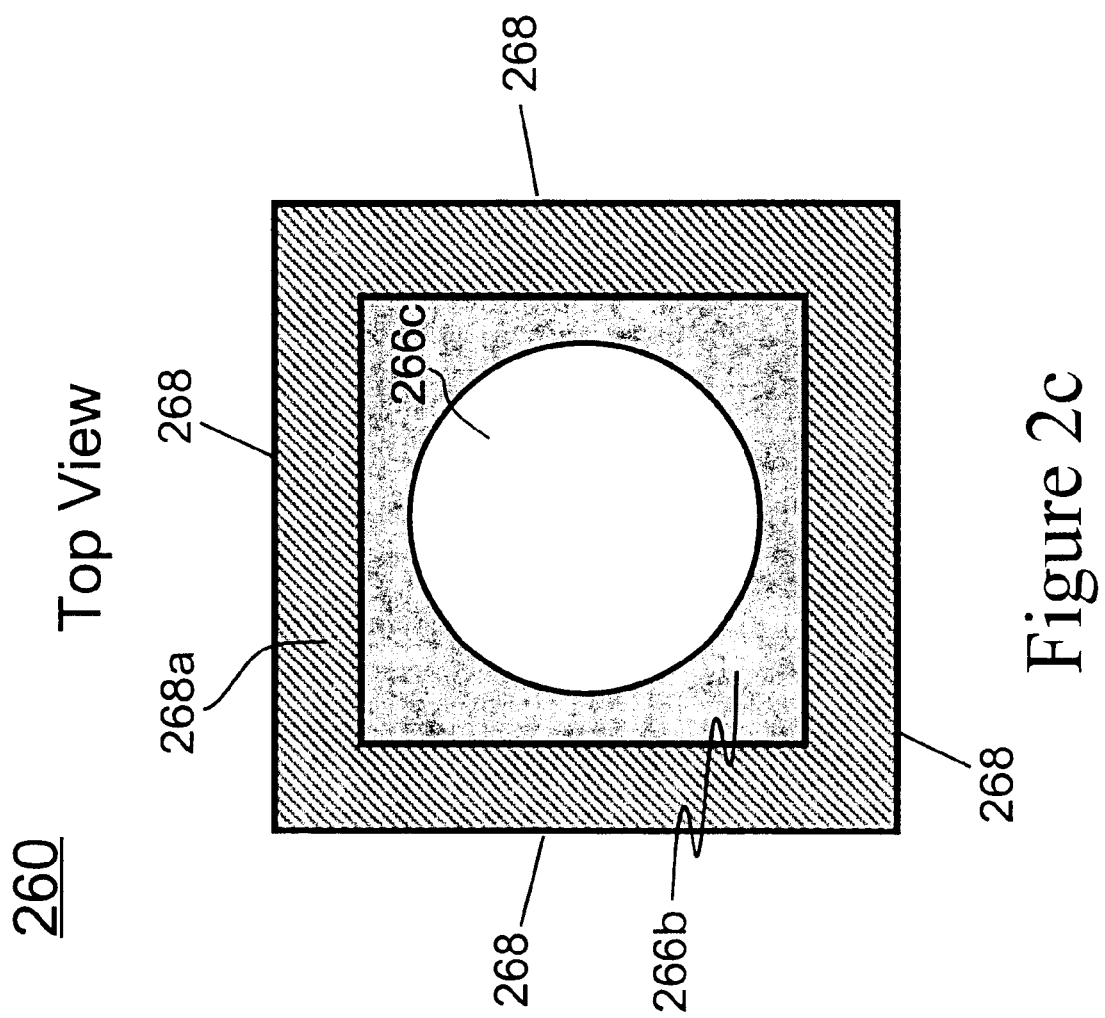

METHOD, SYSTEM AND APPARATUS FOR CHROMATIC DISPERSION COMPENSATION UTILIZING A GIRES-TOURNOIS INTERFEROMETER

CROSS-REFERENCE TO RELATED APPLICATIONS

This application is a Continuation Application of co-pending U.S. patent application Ser. No. 09/718,644, entitled "Method, System and Apparatus for Chromatic Dispersion Compensation Utilizing a Gires-Tournois Interferometer," now U.S. Pat. No. 6,487,342 B1 filed on Nov. 22, 2000.

FIELD OF THE INVENTION

The present invention relates to fiber optic networks, and more particularly to chromatic dispersion compensators utilized in fiber optic communications networks that carry wavelength division multiplexed information signals.

BACKGROUND OF THE INVENTION

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this specification, these individual information-carrying lights are referred to as either "signals" or "channels." The totality of multiple combined signals in a wavelength division multiplexed optical fiber, optical line or optical system, wherein each signal is of a different wavelength range, is herein referred to as a "composite optical signal."

The term "wavelength," denoted by the Greek letter $\lambda$ (lambda) is used synonymously with the terms "signal" or "channel." Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1$–$\lambda_n$. Used in this sense, the term "wavelength" may be understood to refer to "the channel nominally comprised of light of a range of physical wavelengths centered at the particular wavelength, $\lambda$."

One common and well-known problem in the transmission of optical signals is chromatic dispersion of the optical signal. Chromatic dispersion refers to the effect wherein the various physical wavelengths comprising an individual channel either travel through an optic fiber or component at different speeds—for instance, longer wavelengths travel faster than shorter wavelengths, or vice versa—or else travel different length paths through a component. This is a particular problem that becomes more acute for data transmission speeds higher than 2.5 gigabytes per second. The resulting pulses of the signal will be stretched, will possibly overlap, and will cause increased difficulty for optical receivers to distinguish where one pulse begins and another ends. This effect seriously compromises the integrity of the signal. Therefore, for a fiber optic communication system to provide a high transmission capacity, the system must compensate for chromatic dispersion.

The chromatic dispersion characteristics of optical fibers and components are given by the quantity D (ps-km$^{-1}$-nm$^{-1}$) defined by the relationship of Eq. 1

$$D = \frac{d}{d\lambda}\left(\frac{1}{v_g}\right) = \frac{1}{L}\left(\frac{d\tau_g}{d\lambda}\right) \quad (1)$$

wherein $\lambda$ is the channel wavelength (nm), $v_g$ is the group velocity (km/ps), $\tau_g$ is the group delay time (ps), and L is the fiber length (km). If $v_g$ decreases with increasing wavelength (i.e., longer or "red" wavelengths travel slower than relatively shorter or "blue" wavelengths) then D is positive, otherwise D is negative.

Conventional apparatuses that can be used as dispersion compensating components include dispersion compensation fiber, chirped fiber Bragg gratings, and diffraction gratings.

A dispersion compensation fiber, which is used in-line within a fiber communications system, has a special cross-section index profile so as to provide chromatic dispersion that is opposite to that of ordinary fiber within the system. The summation of the two opposite types of dispersion negates the chromatic dispersion of the system. However, dispersion compensation fiber is expensive to manufacture, has a relatively large optical attenuation, must be relatively long to sufficiently compensate for chromatic dispersion and cannot compensate for periodically varying chromatic dispersion.

A chirped fiber Bragg grating is a special fiber with spatially modulated refractive index that is designed so that longer (shorter) wavelength components are reflected at a farther distance along the chirped fiber Bragg grating than are the shorter (longer) wavelength components. By causing certain wavelength components to travel longer distances than other wavelength components, a controlled delay is added to those components and opposite dispersion can be added to a pulse. Unfortunately, a chirped fiber Bragg grating has a very narrow bandwidth for reflecting pulses, and therefore cannot provide a wavelength band sufficient to compensate for light including many wavelengths, such as a wavelength division multiplexed light. A number of chirped fiber Bragg gratings may be cascaded for wavelength multiplexed signals, but this results in an expensive system.

A conventional diffraction grating has the property of outputting different wavelengths at different angles. By using a pair of gratings in a coupled spatial arrangement, this property can be used to compensate chromatic dispersion in a fiber communications system. In such a spatial grating pair arrangement, lights of different wavelengths are diffracted from a first grating at different angles. These lights are then input to a second grating that diffracts them a second time so as to set their pathways parallel to one another. Because the different lights travel with different angles between the two gratings, certain wavelength components are made to travel longer distances than those traveled by other wavelength components. Chromatic dispersion is produced in the spatial grating pair arrangement because the wavelength components that travel the longer distances incur time delays relative to those that travel the shorter distances. This grating-produced chromatic dispersion can be made to be opposite to that of the fiber communications system, thereby compensating the chromatic dispersion within the system. However, a practical spatial grating pair arrangement cannot provide a large enough dispersion to compensate for the relatively large amount of chromatic dispersion occurring in a fiber optic communication system. More specifically, the angular dispersion produced by a diffraction grating is usually extremely small, and is typically approximately 0.05 degrees/nm. Therefore, to compensate for chromatic dispersion occurring in a fiber optic communication system, the two gratings of a spatial grating pair would have to be separated by a very large distance, thereby making such a spatial grating pair arrangement impractical.

Accordingly, there is a need for an improved chromatic dispersion compensator. The present invention addresses such a need.

SUMMARY OF THE INVENTION

A method for compensating for chromatic dispersion of an optical signal includes: receiving the optical signal from an input fiber; collimating the optical signal using a collimator; delivering the collimated optical signal to a Gires-Tournois interferometer; reflecting a chromatic-dispersion-compensated optical signal from the Gires-Tournois interferometer to the collimator; focusing the chromatic-dispersion compensated optical signal into an output fiber. The compensator in accordance with the present invention provides flexibility in producing periodically varying chromatic dispersion so as to compensate for unwanted periodic chromatic dispersion produced in an interferometric interleaved channel separator. Also, the compensator enables compensation of fiber optic chromatic dispersion.

BRIEF DESCRIPTION OF THE FIGURES

FIGS. 2b–2c respectively illustrate a detailed cut-away view and top view of a lens/spacer element that is utilized within the second embodiment of the chromatic dispersion compensator in accordance with the present invention.

FIG. 4c is a graph of the pass band of a channel from one output of the interferometric channel separator of FIG. 4a.

FIG. 6b illustrates the optical pathways of signals comprising even channels and comprising odd channels through the dense optical channel comb filter in FIG. 6a.

FIG. 7b illustrates the optical pathways of signals comprising even channels and comprising odd channels through the dense optical channel comb filter in FIG. 7a.

DETAILED DESCRIPTION

The present invention provides an improved chromatic dispersion compensator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1a through 8b in conjunction with the discussion below.

Figure 1A:
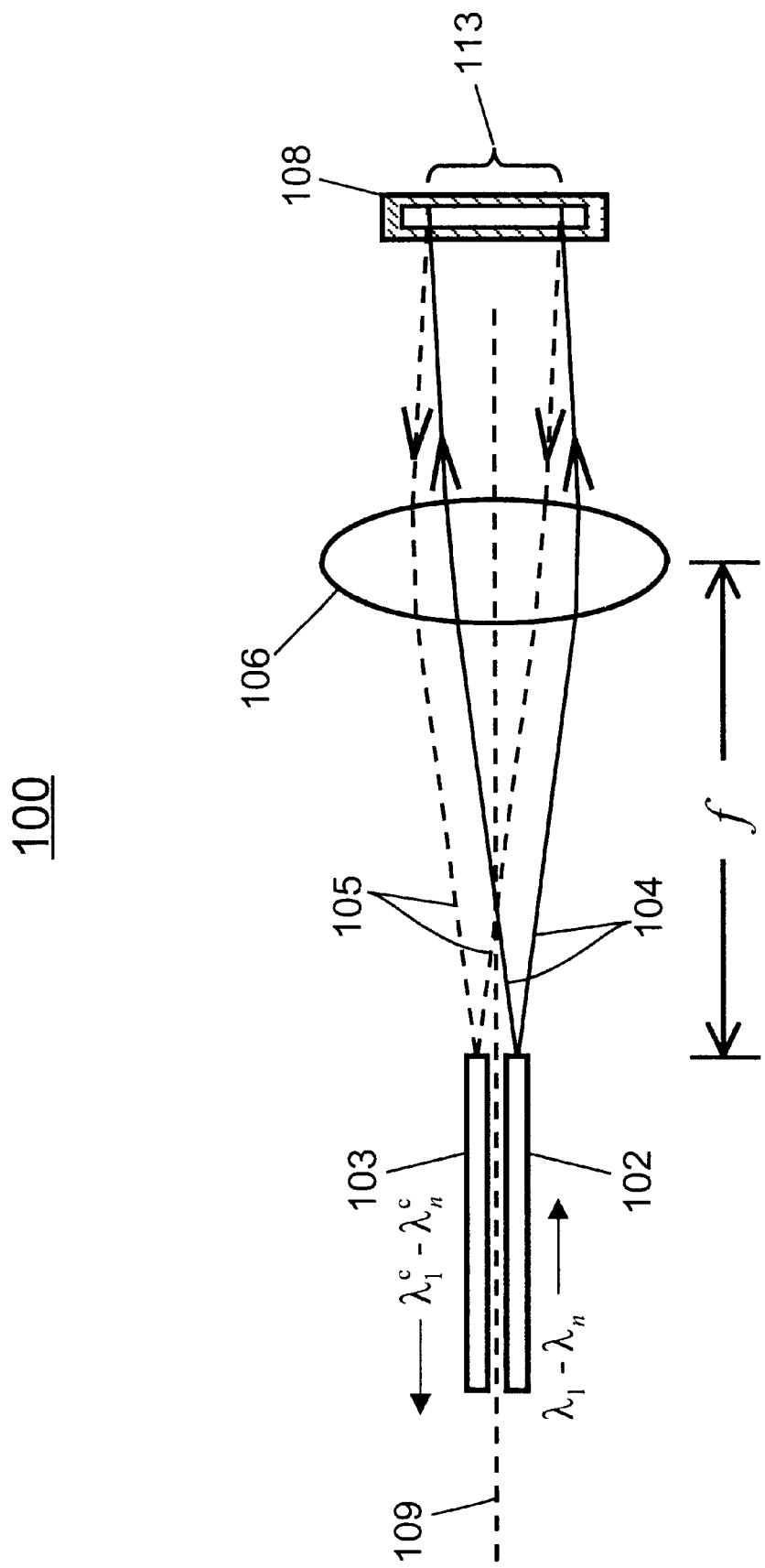
FIG. 1a illustrates a first preferred embodiment of a chromatic dispersion compensator in accordance with the present invention.

FIG. 1a illustrates a first preferred embodiment of a chromatic dispersion compensator in accordance with the present invention. The chromatic dispersion compensator 100 comprises an input fiber 102, an output fiber 103 disposed adjacent and parallel to the input fiber 102, a lens or lens assembly 106 optically coupled to the fibers 102–103 and disposed substantially at its focal distanced from the end faces of the fibers 102–103 and a Gires-Tournois interferometer 108 optically coupled to the lens 106 and disposed at a side of the lens 106 opposite from the fibers 102–103. The two fibers 102–103 are equidistantly disposed about an axis 109 that is parallel to the long dimension of the fibers 102–103 and passes through the center of the lens 106 and the Gires-Tournois interferometer 108.

In operation, a composite optical signal 104 that comprises undesired chromatic dispersion is delivered to the compensator 100 from the input fiber 102, passes through the lens 106 and is collimated by this lens 106. The collimated composite optical signal interacts with and then reflects from the Gires-Tournois interferometer 108 within a region 113 that is centered about the axis 109. The Gires-Tournois interferometer 108 adds a chromatic dispersion to each channel of the composite optical signal 104 as described in greater detail below. This added chromatic dispersion compensates for undesired chromatic dispersion in the composite optical signal 104 by algebraic cancellation–that is, wavelengths of light of each channel comprising undesired positive chromatic dispersion receive compensatory negative chromatic dispersion and vice versa. The added chromatic dispersion comprises a periodicity in frequency that matches the spacing between channels. The reflected, dispersion compensated composite optical signal 105 then returns from the Gires-Tournois interferometer 108 as a collimated beam that is focused by lens 106 into the output optical fiber 103.

Figure 1B:
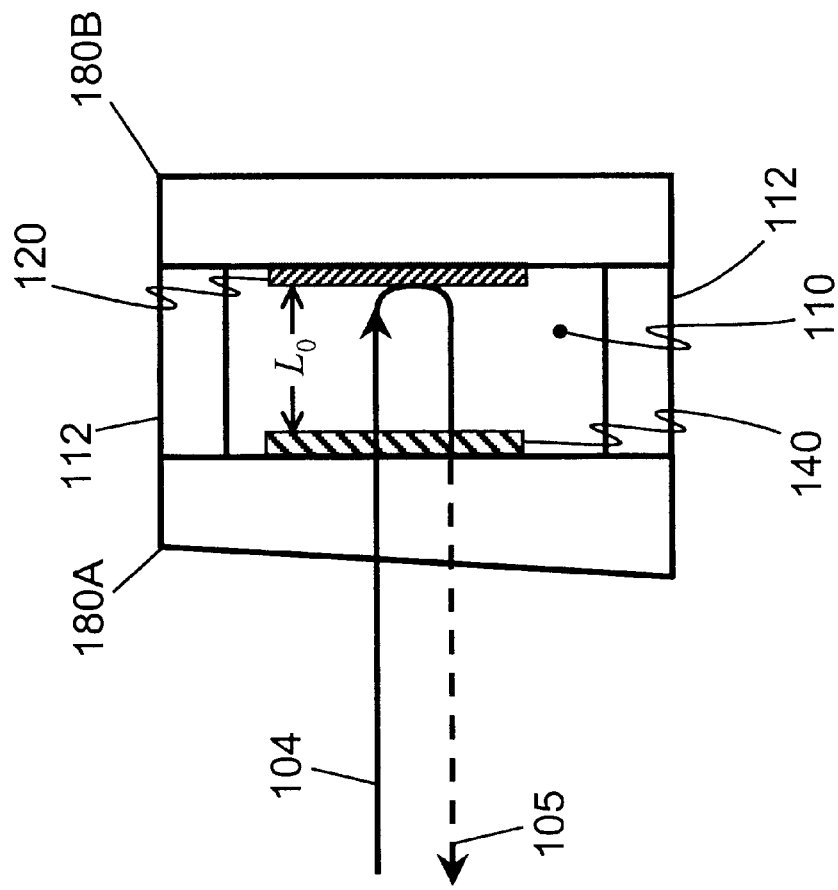
FIGS. 1b–1d illustrate a first, second, and third preferred embodiments of a Gires-Tournois interferometer that may be utilized within the chromatic dispersion compensator in accordance with the present invention.

FIG. 1b illustrates a first preferred embodiment of a Gires-Tournois interferometer that may be utilized within the chromatic dispersion compensator in accordance with the present invention. The Gires-Tournois interferometer 108.1 comprises two glass plates 180A–180B optically coupled to one another, wherein the first glass plate 180A comprises a wedge shape. The inside face of the second glass plate 180B is coated to form a reflective surface 120 with a reflectivity preferably of approximately 100%. The inside face of the first glass plate 180A is substantially parallel to the inside face of glass plate 180B and is coated to form a partially reflective surface 140 with a reflectivity less than 100%. The two glass plates are separated by spacers 112, such that an interferometric cavity 110 of optical path length $L_o$ is created between the partially reflective surface 140 and the 100% reflective surface 120. The spacers 112 preferably comprise a zero-thermal-expansion or low-thermal-expansion material. The length of the spacers 112 is adjusted during manufacture so as to provide a desired periodicity to the chromatic dispersion of the Gires-Tournois interferometer 108.

It is well known that interference between separate portions of light reflected from the front 140 and rear 120 reflective surfaces of a Gires-Tournois interferometer 108 produces a periodic variation of phase shift of the reflected light. Assuming no light loss between the two reflective surfaces 120 and 140, a 100% reflectivity of the rear surface 120, a power reflectance r of the front surface 140, a physical distance d between the two surfaces 120 and 140, and a refractive index $\eta$ of the material between the two surfaces 120 and 140, the phase shift $\theta$ of a Gires-Tournois interferometer is given by $$\theta = -2\tan^{-1}\left[\frac{1-\sqrt{r}}{1+\sqrt{r}}\tan\left(\frac{2\pi\eta d}{\lambda}\right)\right] = -2\tan^{-1}\left[\frac{1-\sqrt{r}}{1+\sqrt{r}}\tan\left(\frac{2\pi v\eta d}{c}\right)\right] \quad (2)$$

wherein $\lambda$ is wavelength, v is frequency and c is the velocity of light. In the Gires-Tournois interferometer 108.1 (FIG. 1b), $\eta=1$ and thus $\eta d=L_o$. The period, or Free Spectral Range, $FSR_{GT}$, associated with $\theta$ is given, in terms of frequency, by $$FSR_{GT}=c/2\eta d \quad (3)$$

The group delay $\tau_{GT}(\lambda)$ introduced by the interferometer as a function of wavelength, in units of time is then given by $$\tau_{GT}(\lambda) = \frac{-\lambda^2}{2\pi c}\frac{d\theta}{d\lambda} \quad (4)$$

and the introduced chromatic dispersion in units of time per unit wavelength is given by $$D_{GT}(\lambda) = \frac{d\tau_{GT}}{d\lambda} \quad (5)$$

wherein $\theta$ is as given by Equation 2 above.

Figure 1C:
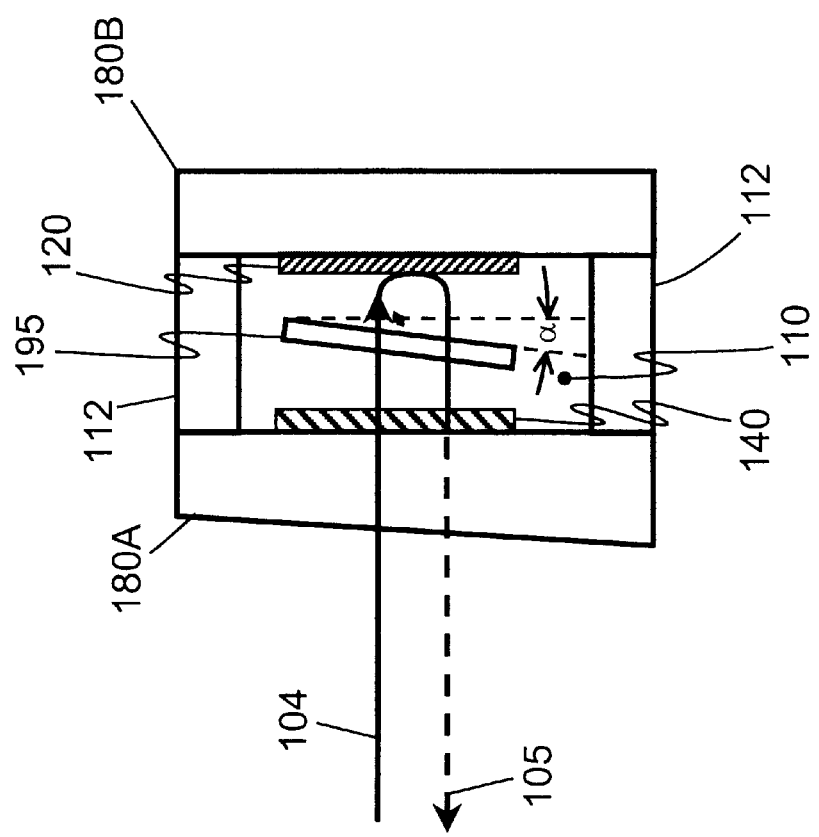

FIG. 1c illustrates a second preferred embodiment of a Gires-Tournois interferometer that may be utilized within the chromatic dispersion compensator in accordance with the present invention. The Gires-Tournois interferometer 108.2 comprises all the elements of the Gires-Tournois interferometer 108.1 (FIG. 1b) in addition to an optical length adjustment element 195. The optical length adjustment element 195 preferably comprises glass and is disposed within the cavity 110 at a certain "tilt" angle $\alpha$ with respect to the reflective surfaces 120 and 140. The optical path length $L_0$ between the reflective surfaces 120 and 140 depends, in part, on the optical path length $L_{195}$ through the optical length adjustment element 195. This quantity $L_{195}$ is, in turn, related to the physical path length of signals 104–105 through the element 195 as well as the refractive index of element 195. Since, this physical path length depends upon the tilt angle $\alpha$ of element 195, then it follows that the quantity $L_{195}$ and the quantity Lo depend upon the angle $\alpha$. Thus, by adjusting the angle $\alpha$, it is possible to control the "phase" of the periodic curve of the chromatic dispersion produced by constructive and destructive interference within the cavity 110. The angle $\alpha$ may be set during manufacture or may be adjustable by means of a mechanical tilt adjustment so that the chromatic dispersion periodicity may be varied during operation of the dispersion compensator 100.

Figure 1D:
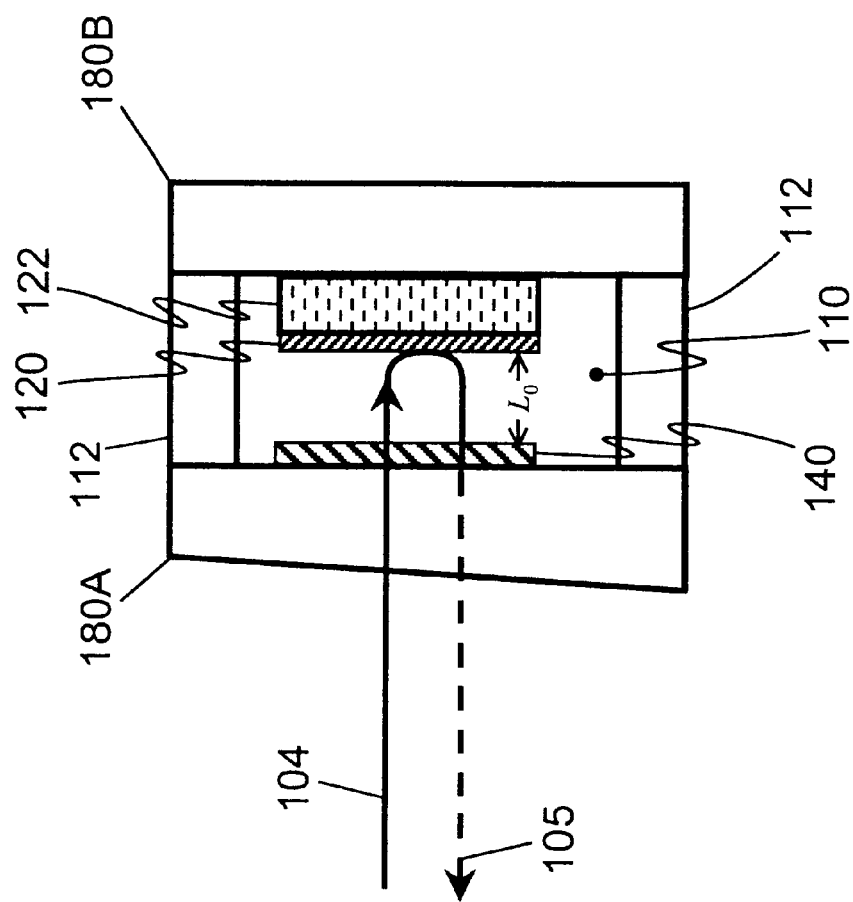

FIG. 1d illustrates a third preferred embodiment of a Gires-Tournois interferometer that may be utilized within the chromatic dispersion compensator in accordance with the present invention. The Gires-Tournois interferometer 108.3 comprises all the elements of the Gires-Tournois interferometer 108.1 (FIG. 1b) in addition to a piezoelectric element 122 attached to the second glass plate 180B. Instead of being disposed on the second glass plate 180B, the 100% reflective surface 120 comprising the Gires-Tournois interferometer 108.3 is disposed upon the piezoelectric element 122 facing into the cavity 110. By controlling a voltage applied across the piezoelectric element 122, the variable thickness t of the piezoelectric element 122 may be very accurately controlled. This property of piezoelectric materials is well known. In this fashion, the optical path length $L_0$ between the reflective surfaces 120 and 140 may be controlled. Thus, by adjusting the thickness t, it is possible to control the "phase" of the periodic curve of the chromatic dispersion produced by constructive and destructive interference within the cavity 110.

Figure 2A:
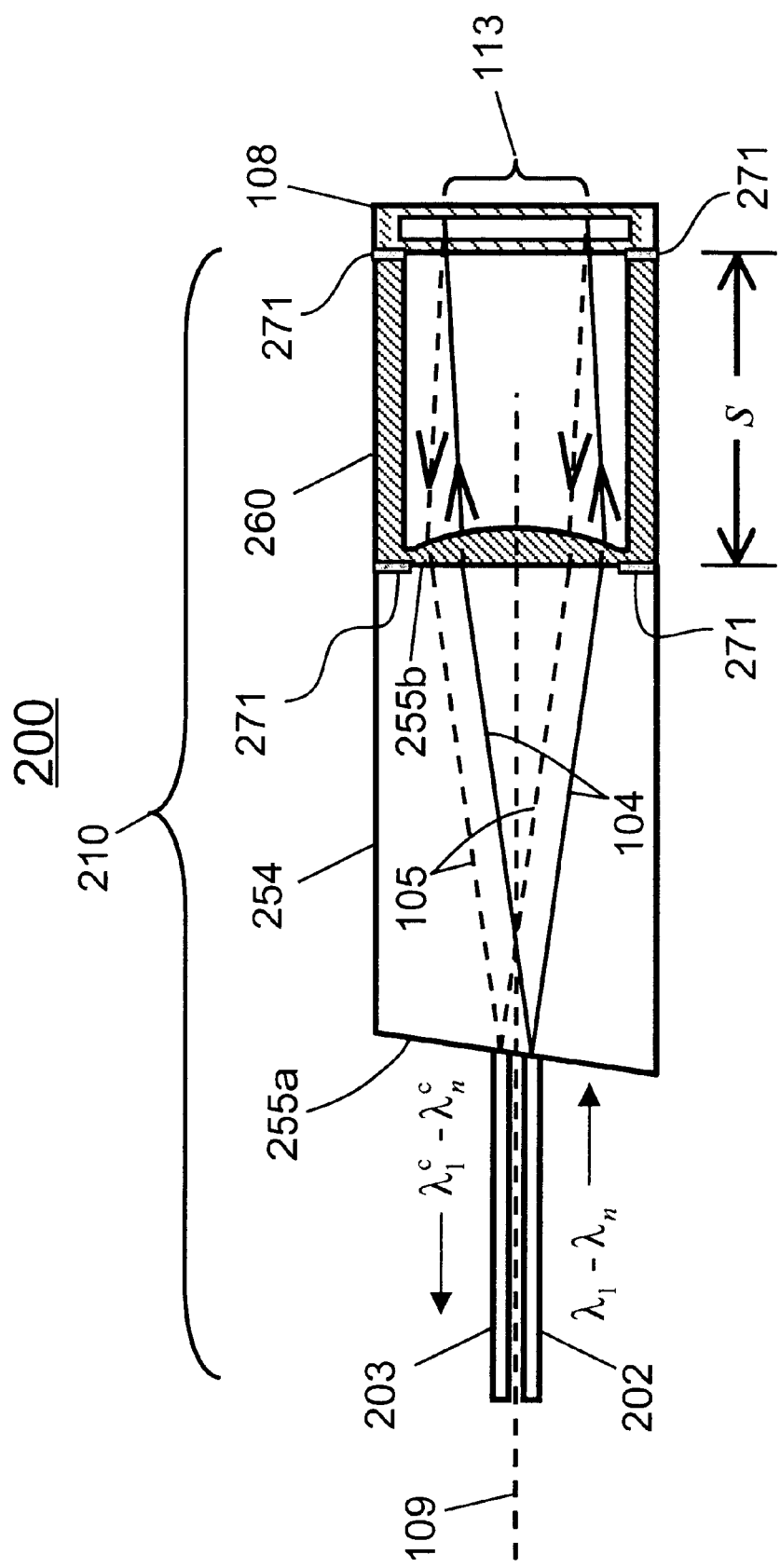
FIG. 2a illustrates a second preferred embodiment of the chromatic dispersion compensator in accordance with the present invention.

FIG. 2a illustrates a second preferred embodiment of a chromatic dispersion compensator in accordance with the present invention. The chromatic dispersion compensator 200 operates similarly to the chromatic dispersion compensator 100 (FIG. 1a) since both of these embodiments incorporate the same Gires-Tournois interferometer 108. However, the chromatic dispersion compensator 200 utilizes an integrated optical collimator device 210 in place of the separate lens 106 and fibers 102–103 of the chromatic dispersion compensator 100 (FIG. 1a). The integrated optical collimator device is described in more detail in a co-pending U.S. patent application entitled "Optical Collimator Device Utilizing an Integrated Lens/Spacer Element", Ser. No. 09/739,951, filed on Dec. 18, 2000 now abandonment, which is incorporated herein in its entirety by reference. The optical collimator device 210 comprises an input optical fiber 202, an output optical fiber 203, a glass plate 254 that is optically coupled to the two optical fibers 202–203, and a lens/spacer element 260 that is optically coupled to the glass plate 254 at a side opposite to the optical fibers 202–203. The glass plate 254 comprises a first end face 255a and a second end face 255b. The end face 255a is disposed at a slight angle to the long dimensions of the fibers 202–203 to prevent unwanted back reflections.

The lens/spacer element 260 is physically coupled to both the plate 254 and the Gires-Tournois interferometer 108 by suitable adhesive 271 which preferably comprises epoxy. The magnitude of the length s of the lens/spacer element 260 is chosen so that the incoming uncompensated signal light 104 (FIG. 2a), after having been collimated and diverted by the lens/spacer element 260, impinges upon and reflects from the Gires-Tournois interferometer 108 within a region 113 that is centered about the axis 109 extending parallel to and midway between the two fibers 202–203 (FIG. 2a). With the value of s so chosen, the reflected and compensated signal light 105 is re-focused by the lens/spacer element 260 in such a way as to enter the output fiber 203.

Figure 2B:
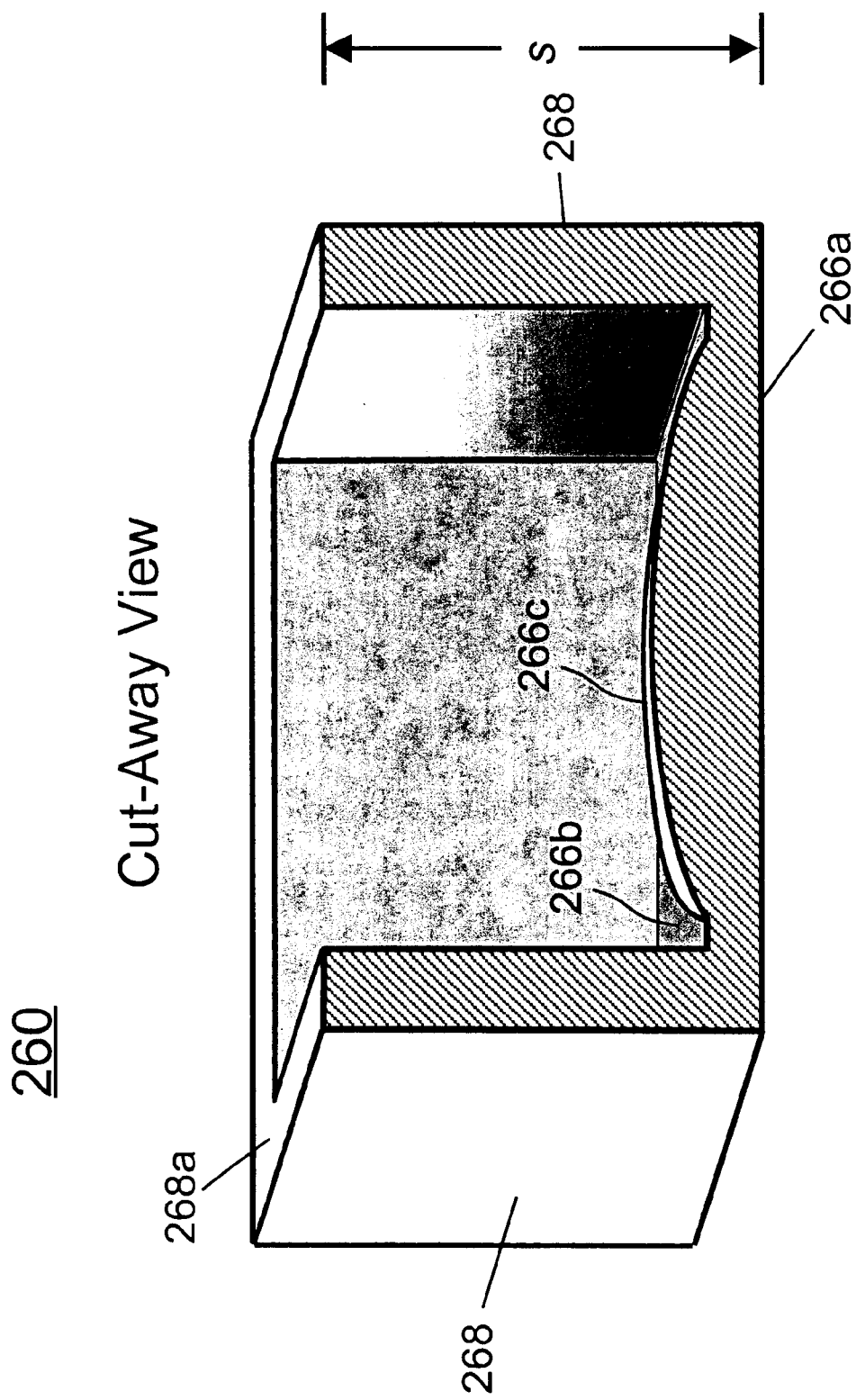

FIGS. 2b–2c respectively illustrate a detailed cut-away view and top view of a lens/spacer element 260 that is utilized within the second preferred embodiment of the chromatic dispersion compensator in accordance with the present invention. The lens/spacer element 260 comprises a single piece of material of a complex shape and may be approximately described as a rectangular block hollowed out from one side with a lens surface on the interior face of the opposing side. The material comprising the lens/spacer element 260 comprises an optically isotropic material, preferably glass or solid polymer, which can be cut from or molded into a single piece.

Specifically, the lens/spacer element 260 comprises a floor section integrated with four side-wall sections 268. The floor section comprises a substantially flat exterior basal surface 266a, a flat interior floor surface 266b adjoining the side-walls 268 and a raised convex lens surface 266c protruding centrally above the interior floor surface 266b. The exterior basal surface 266a defines a "bottom" of the lens/spacer element 260. The top surface 268a is substantially flat and substantially parallel to the basal surface 266a and comprises the ends of the four side-wall segments 268.

In operation, the raised convex surface 266c performs the function of either a collimating or focusing lens for a through-going set of light rays, wherein the light rays are constrained to pass only through the portion of the floor section lying "underneath" the convex surface 266c. The top surface 268a and the portion of the exterior basal surface 266a lying "underneath" the flat interior floor surface 266b and the side walls 268 comprise attachment areas of the lens/spacer element 260 whereupon adhesive 271 may be applied (FIG. 2a). Through this attachment configuration, light is prevented from passing through the adhesive. The four side-wall segments 208 comprise spacers of length s.

Figure 3:
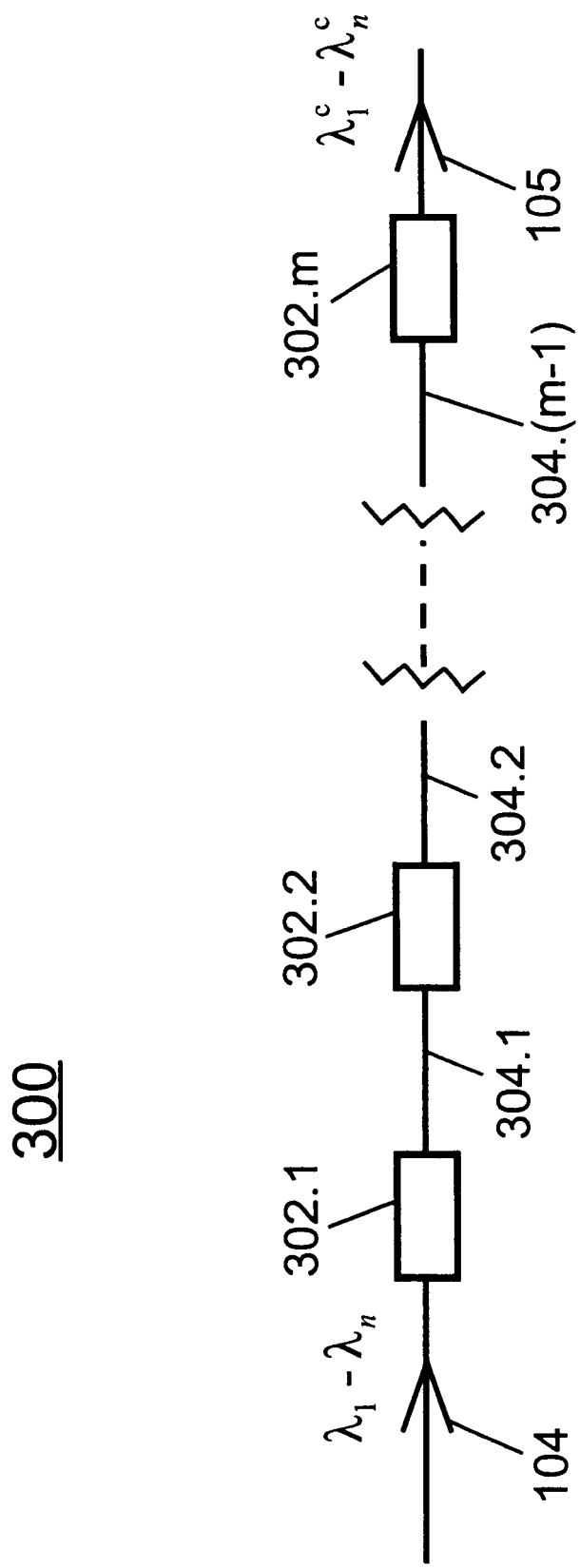
FIG. 3 illustrates a third preferred embodiment of the chromatic dispersion compensator in accordance with the present invention.

FIG. 3 illustrates a third preferred embodiment of a chromatic dispersion compensator in accordance with the present invention. The chromatic dispersion compensator 300 comprises a set of m multiple sequentially arranged dispersion compensators 302.1–302.m. Each of the individual compensators 302.1, 302.2, ..., 302.m may comprise the specific device 100 (FIG. 1a) or the specific device 200 (FIG. 2a). Further, the Gires-Tournois interferometer 108 comprising each of the individual compensators 302.1, 302.2, ..., 302.m may comprise any one of the device embodiments 108.1 (FIG. 1b), 108.2 (FIG. 1c) or 108.3 (FIG. 1d). The individual compensators 302.1, 302.2, ..., 302.m are optically coupled in sequence by the m−1 optical couplings 304.1–304.(m−1), each of which preferably comprises an optical fiber.

In the device 300, the various Gires-Tournois interferometers 108 within the sequence of individual compensators 302.1, 302.2, ..., 302.m comprise various sets of operational parameters that may vary from one individual compensator to another. These operational parameters associated with a particular one of the individual compensators 302.1, 302.2, ..., 302.m comprise the reflectivity $r_1$ of the front reflective surface 140 (FIG. 1b) of and the optical path length $L_0$ of the interferometer 108 of the particular compensator. As is explained in greater detail in the discussion of FIG. 4 below, a variation in $r_1$ changes the breadth and height of the peaks of the curve of introduced chromatic dispersion whereas a variation of Lo effectively changes the "phase" of these peaks, as a function of physical wavelength. By summing the resulting series of chromatic dispersion curves, the compensatory chromatic dispersion introduced by the device 300 may be made to conform to a particular desired form, as a function of physical wavelength.

In operation of the chromatic dispersion compensator 300 (FIG. 3), a composite optical signal 104 that requires chromatic dispersion compensation and comprises the set of n channels $\lambda_1$–$\lambda_n$ enters the first compensator 302.1 in the series of compensators. The composite optical signal 104 is then directed to each one of the remaining individual compensators 302.2–302.m in sequence by means of the optical couplings 304.1–304.(m−1). In each of the individual compensators 302.1–302.m, partial compensatory chromatic dispersion is introduced into each of the channels $\lambda_1$–$\lambda_n$ comprising the composite optical signal 104. Finally, the composite optical signal 105 comprising the chromatic dispersion compensated channels $\lambda_1^c$–$\lambda_n^c$ exits the device 300 from the compensator 302.m. The compensatory chromatic dispersion introduced into each of the channels comprises the algebraic sum of that introduced within each one of the individual compensators 302.1–302.m. Since each individual compensators 302.1–302.m introduces a periodic chromatic dispersion curve into the composite optical signal and since the period and magnitude of the introduced chromatic dispersion may vary one such compensator to another in a controlled fashion, very complicated periodic dispersion may be generated by (and thus compensated by) the chromatic dispersion compensator 300.

Figure 4A:
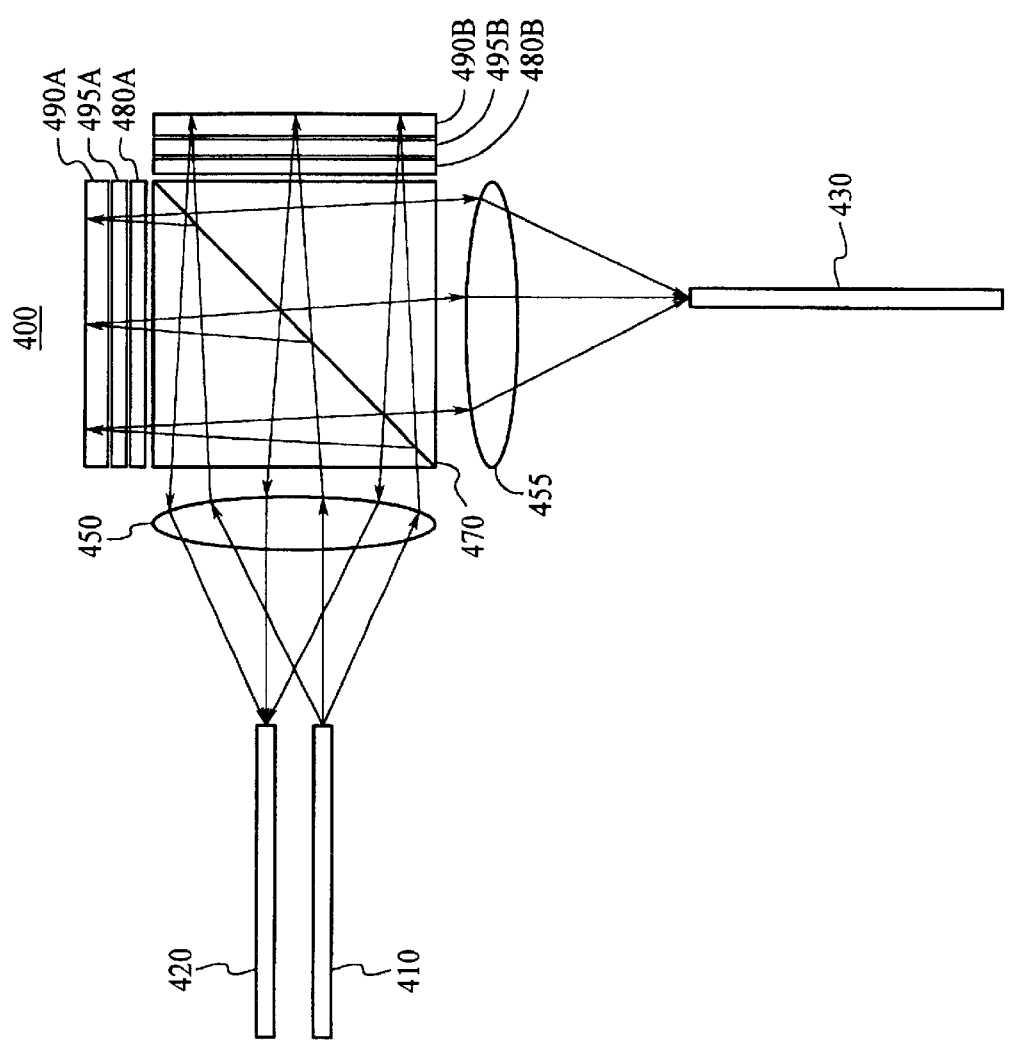
FIGS. 4a–4b illustrate an interferometric channel separator which may cause undesirable chromatic dispersion.
Figure 4B:
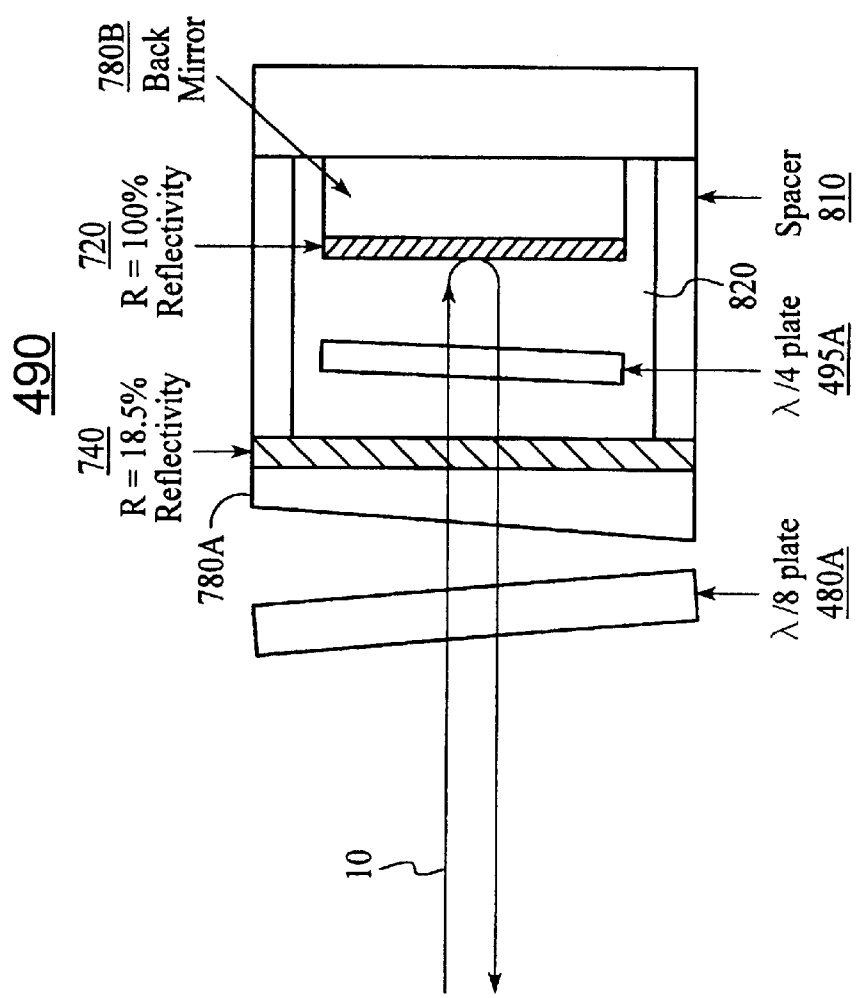
Figure 4C:
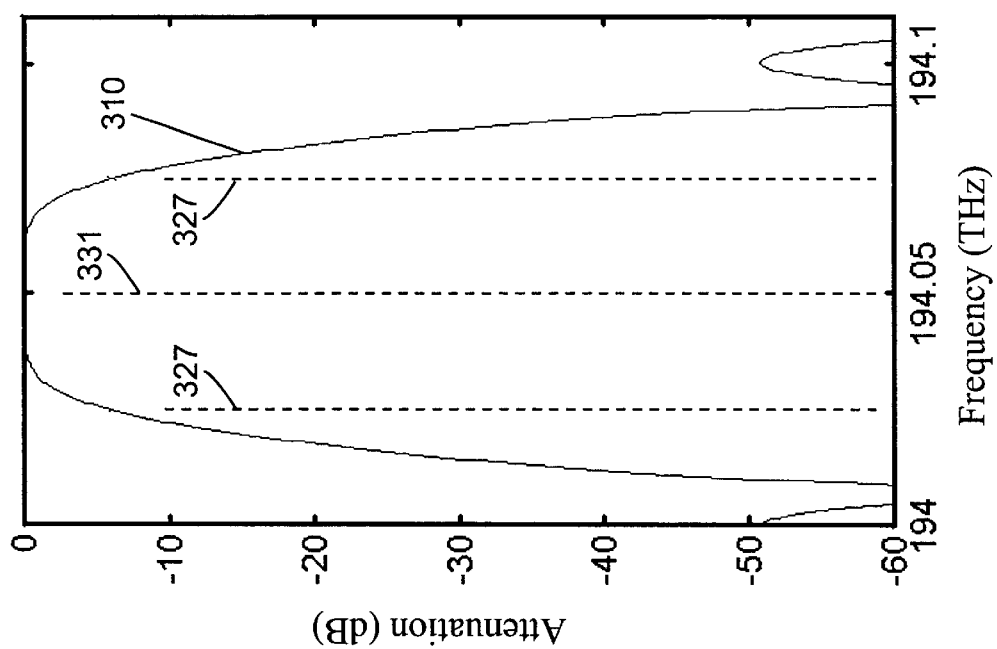
Figure 4D:
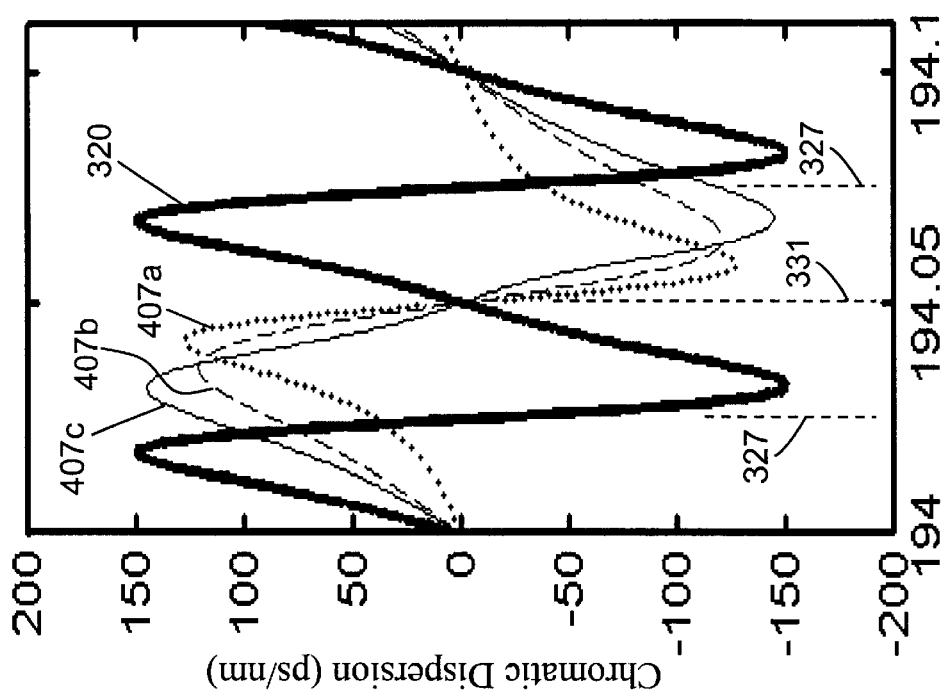
FIG. 4d is a graph of the chromatic dispersion produced by the channel separator in FIG. 4a together with graphs of the chromatic dispersion produced by three different configurations of chromatic dispersion compensator in accordance with the present invention.

For example, FIGS. 4a–4b illustrate an interferometric channel separator which may cause undesirable chromatic dispersion. FIG. 4c is a graph of a typical channel pass band, and FIG. 4d is a graph of a typical curve of the undesirable chromatic dispersion introduced in the vicinity of the channel pass band by the interferometric channel separator in FIG. 4a. Additional graphs in FIG. 4d represent the typical chromatic dispersion of curves that may be introduced by three different configurations of a chromatic dispersion compensator in accordance with the present invention.

The separator illustrated in FIG. 4a is described in detail in U.S. Pat. No. 6,130,971, filed on Aug. 6, 1998, issued on Oct. 10, 2000, and assigned to the assignee of the present application, which is incorporated herein in its entirety by reference. The separator 400 comprises an optic fiber 410 for inputting an optical signal and optic fibers 420 and 430 for outputting optical signals. As the signal leaves the optic fiber 410, it diverges. A lens 450 contains the signal and directs it toward a polarization beam splitter 470 which decomposes the signal based on its polarity. The S-polarized portion of the signal is reflected toward an interferometer 490A. The P-polarized portion of the signal passes through the polarization beam splitter 470 toward an interferometer 490B. The interferometers 490A and 490B introduce phase differences between the even and odd channels of the S polarization light and P polarization light. Together with the properties of the polarization beam splitter, these phase shifts result in one set of channels (e.g., the "odd" channels) being directed to fiber 420 whilst the remaining channels (e.g., the "even" channels) are directed to fiber 430.

FIG. 4b illustrates an embodiment of an interferometer 490 which may be used within the separator 400 as the interferometers 490A–490B. This interferometer has been disclosed in co-pending U.S. patent application entitled "Nonlinear Interferometer for Fiber Optic Dense Wavelength Division Multiplexer Utilizing a Phase Differential Method of Wavelength Separation," Ser. No. 09/247,253 now U.S. Pat. No. 6,169,604, filed on Feb. 10, 1999 and assigned to the assignee of the present application. Applicant hereby incorporates the application by reference.

The interferometer 490 (FIG. 2) comprises two glass plates 780A–780B. The inside face of the glass plate 780B is coated with a layer of reflective coating 720 with a reflectivity preferably of 100%. The inside face of the glass plate 780A is coated with a layer of reflective coating 740 with a reflectivity preferably of approximately 18%. The two glass plates 780A–780B are set apart by zero expansion cavity spacers 810, creating a main cavity 820. The working principle of the interferometer 490 is described in detail in the above referenced patent application, Ser. No. 09/247,253 now U.S. Pat. No. 6,169,604. The two interferometers 490A–490B have the same structure and function in the same manner.

FIG. 4c shows a typical optical pass band spectrum corresponding to one particular channel—whose center 331 is at 194.05 THz—of a first output (either "even" or "odd") of the channel separator 400 (FIG. 4a). Further pass bands corresponding to other channels (not shown) from the same output are spaced every 100 GHz (i.e., 0.1 TH$_2$). For instance, pass band centers of neighboring channels comprising the same output are located at 193.95 THz and 194.15 THz. Pass bands corresponding to channels (not shown) corresponding to the second output from the same channel separator are also spaced every 100 GHz, but are offset by 50 GHz from those of the first output. For instance, pass band centers of channels comprising the second output are located at 194.00 THz, 194.10 THz, etc. The pass bands of even and odd channels cross at a repeating sequence of frequencies comprising 50% transmission points 327.

The interleaved outputs of the interferometer-based channel separator 400 (FIG. 4a) can exhibit a large amount of high-order, nonlinear chromatic dispersion. This problem is significantly compounded when these channel separators are cascaded (i.e., sequentially arranged) to produce high channel isolation. In such a configuration, the chromatic dispersion can vary from as high as +150 ps/nm to −150 ps/nm within each passband.

FIG. 4d illustrates the chromatic dispersion curve 320 of the channel separator 400 (FIG. 4a). The curve 407a, indicated by a dotted line, illustrates the corrective compensation provided by utilizing a single chromatic dispersion compensation device in accordance with the present invention comprising either the device 100 or the device 200. Because the "peaks" in curve 407a correspond to "valleys" in curve 320, this single device configuration can eliminate (that is, compensate for) much of the chromatic dispersion of the channel separator 400, as given by curve 320. However, this configuration yields a very sharp transition in curve 407a from large positive dispersion to large negative dispersion at the center frequency 331 of the channel pass band.

The curve 407b of FIG. 4d, indicated by a dashed line, illustrates the corrective compensation provided by utilizing the chromatic dispersion compensator device 300 comprising two individual compensators 302.1–302.2 wherein the front reflective surface reflectivities $r_1$ are reduced relative to the device represented by curve 407a. In this case, the sharpness of the transition is reduced such that this second configuration provides a more uniform dispersion compensation in the vicinity of the pass band centers 331. The curve 407c of FIG. 4d, indicated by a thin solid line, illustrates the corrective compensation provided by utilizing the chromatic dispersion compensator device 300 comprising three individual compensators 302.1–302.3 wherein the front surface 140 reflectivities $r_1$ are similar but the cavity optical path lengths are all different. In this configuration, the positive dispersion region of the second compensator 302.2 can be made to partially cancel the negative dispersion region of the first compensator 302.1 before the net zero-dispersion crossover point at the pass band center 331 whilst the negative dispersion region of the first compensator 302.1 can be made to partially cancel the positive dispersion of the second compensator 302.2 after the net zero-dispersion crossover point. These cancellations creates a central region of slow variation from positive to negative dispersion at the pass band center 331. The third compensator 302.3 is included to provide an extra degree of freedom in the generation of the summation curve.

Many other choices may be made in terms of the numbers, surface reflectivities and optical path lengths of the various interferometer devices comprising the chromatic dispersion compensator 300, and the invention is not intended to be limited to the specific example of three devices described above. It can be seen from the example of FIG. 4d that any desired level of chromatic dispersion compensation may be achieved within the vicinity of the channel separator pass band by using the chromatic dispersion compensators in accordance with the present invention. The residual chromatic dispersion can be made closer to zero—that is, the chromatic dispersion of the channel separator can be more accurately compensated—within a wider frequency region by utilizing more than three individual compensators 302.1, 302.2, etc. within the device 300.

The temperature dependence of the chromatic dispersion curve of any of the chromatic dispersion compensators 100, 200, 300 in accordance with the present invention is substantially identical to that of the channel separator 400(FIG. 4a) described above. This is because the Gires-Tournois interferometer 108 comprising various embodiments in accordance with the present invention is constructed similarly to the non-linear interferometer 490 (FIG. 4b) comprising the channel separator 400. Therefore, any FSR shifts of the channel separator 400 with temperature are mimicked by similar FSR shifts within the chromatic dispersion compensators 100, 200, 300 in accordance with the present invention. Thus, the degree of chromatic dispersion compensation is virtually temperature insensitive.

Figure 5A:
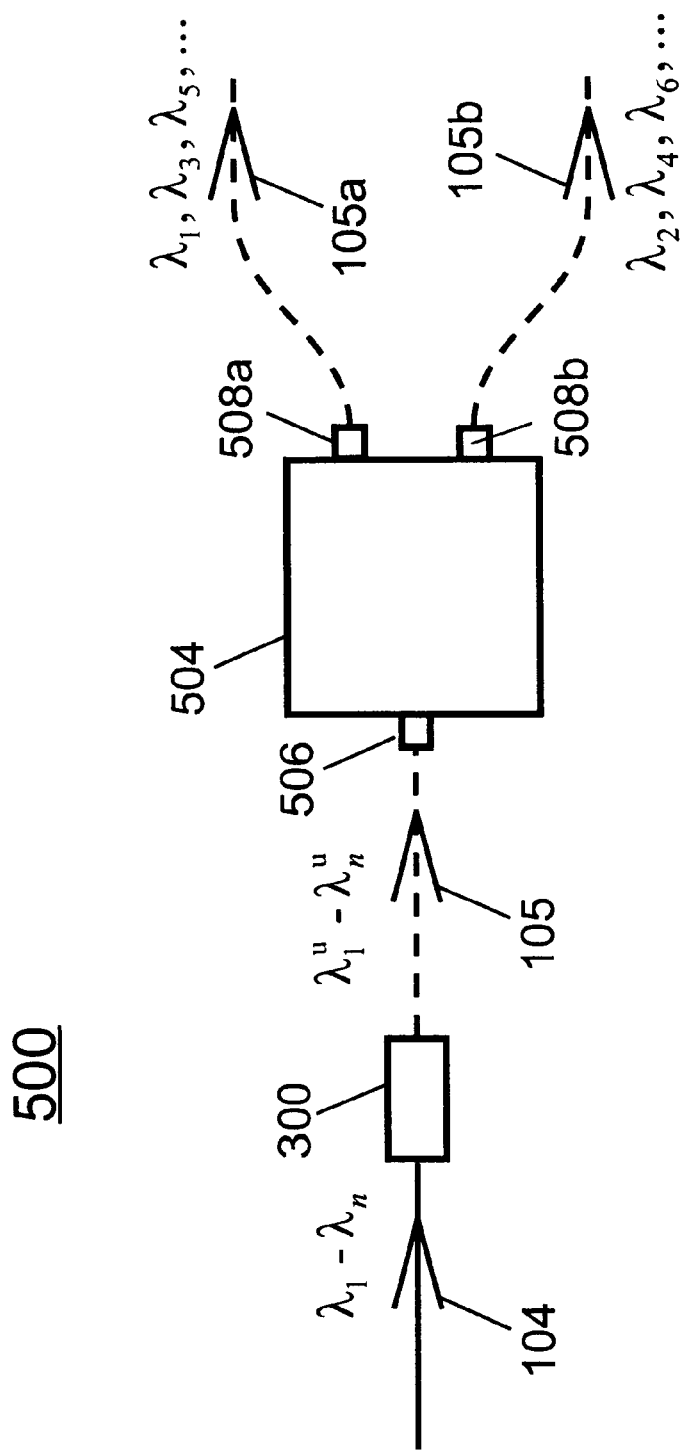
FIGS. 5a–5c, respectively, illustrate a first, second, and third preferred embodiments of a system for compensating for chromatic dispersion in accordance with the present invention.

FIG. 5a illustrates a first preferred embodiment of a system for compensating for chromatic dispersion in accordance with the present invention. In the system 500, the chromatic dispersion of a 1×2 channel separator 504 is compensated. A single chromatic dispersion compensator 300 and a 1×2 channel separator 504 are optically coupled in sequence such that the output of the chromatic dispersion compensator 300 is subsequently input to the channel separator 504. In operation of the system 500, a composite optical signal 104 comprising the n channels $\lambda_1 - \lambda_n$ is input to the chromatic dispersion compensator 300 from a fiber optic communications system or line. The chromatic dispersion compensator 300 comprises any number m (m≧1) of sequentially disposed individual devices each in accordance with either the first embodiment 100 (FIG. 1a) or the second embodiment 200 (FIG. 2a) of the compensator in accordance with the present invention. It is assumed that the channels of the input composite optical signal 104 do not comprise chromatic dispersion. Subsequently, the chromatic dispersion compensator 300 produces chromatic dispersion within each of the channels and outputs a composite optical signal 105 wherein the channels $\lambda_1'' - \lambda_n''$ incorporate the added chromatic dispersion. The composite optical signal 105 is then input to the input port 506 of the 1×2 channel separator 504 wherein it is separated into a first set 105a comprising the odd channels $\lambda_1, \lambda_3, \lambda_5, \ldots$ output from output port 508a, and a second set 105b comprising the even channels $\lambda_2, \lambda_4, \lambda_6, \ldots$ output from output port 508b. The two sets 105a–105b are then delivered to one or more fiber optic communications systems or lines. The 1×2 channel separator 504 introduces additional chromatic dispersion to each one of the channels comprising the two sets 105a–105b. The chromatic dispersion compensator 300 is configured such that the chromatic dispersion produced in each of the channels by the 1×2 channel separator 504 substantially cancels the chromatic dispersion previously produced by the chromatic dispersion compensator 300. Therefore, the channels comprising of each of the outputs 105a–105b of the channel separator 504 exhibit substantially no chromatic dispersion upon output from the system 500.

Figure 5B:
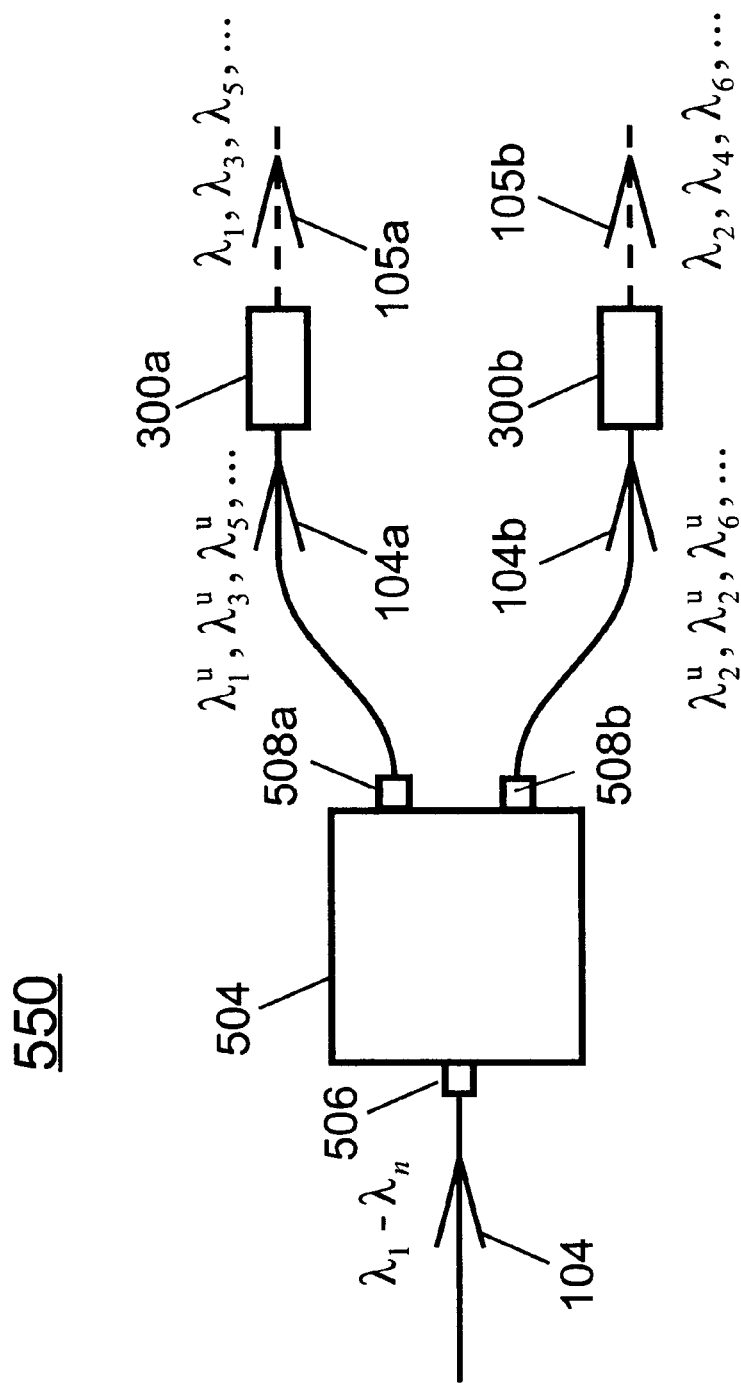

FIG. 5b illustrates a second preferred embodiment of a system for compensating for chromatic dispersion in accordance with the present invention. As in system 500 (FIG. 5a), system 550 also compensates for the chromatic dispersion of a 1×2 channel separator 504. In the system 550, a 1×2 channel separator 504 is optically coupled in sequence with two chromatic dispersion compensators 300a–300b such that the first, odd-channel, set 104a output from the 1×2 channel separator 504 is subsequently input to the first chromatic dispersion compensator 300a and the second, even-channel, set 104b output from the 1×2 channel separator 504 is subsequently input to the second chromatic dispersion compensator 300b. Each of the chromatic dispersion compensator 300a–300b comprises any number m (m≧1) of sequentially disposed individual compensators in accordance with either the first embodiment 100 (FIG. 1a) or the second embodiment 200 (FIG. 2a) of the compensator in accordance with the present invention.

In operation of the system 550 (FIG. 5b), a composite optical signal 104 comprising the n channels $\lambda_1$–$\lambda_n$ is input to the to the 1×2 channel separator 504 at input port 506a wherein it is separated into a first set 104a comprising the odd channels output from output port 508a and a second set 104b comprising the even channels output from output port 508b. It is assumed that the channels of the input composite optical signal 104 do not comprise chromatic dispersion. The 1×2 channel separator 504 produces undesired chromatic dispersion within each one of the channels comprising the two sets 104a–104b. The two sets 104a–104b are then delivered to chromatic dispersion compensators 300a and 300b, respectively. The chromatic dispersion compensator 300a produces additional chromatic dispersion within each channel that substantially cancels the chromatic dispersion previously produced in the set 104a by the 1×2 channel separator 504. Likewise, the chromatic dispersion compensator 300b produces additional chromatic dispersion within each channel that substantially cancels the chromatic dispersion previously produced in the output 104b by the 1×2 channel separator 504. The periodicity of the chromatic dispersion added by the chromatic dispersion compensator 300a (300b) is tuned so as to be substantially out of phase with the undesired chromatic dispersion within the odd (even) channels. Therefore, the channels comprising each of the sets 105a–105b of the chromatic dispersion compensators 300a–300b exhibit substantially no chromatic dispersion upon output from the system 550.

Figure 5C:
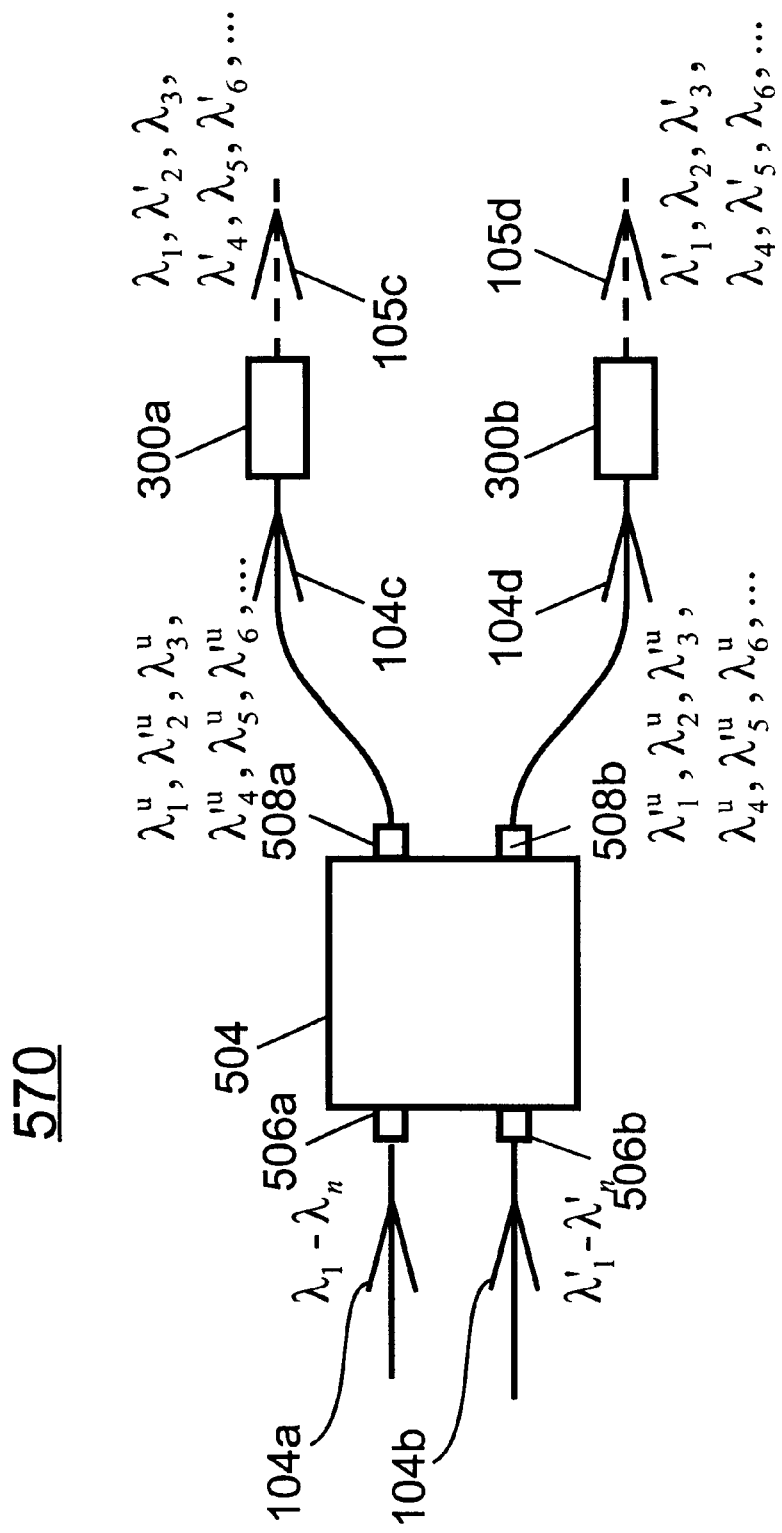

FIG. 5c illustrates a third preferred embodiment of a system for compensating for chromatic dispersion in accordance with the present invention. In system 570, the chromatic dispersion of a 2×2 channel separator 504 is compensated. In the system 570, a 2×2 channel separator 504 is optically coupled in sequence with two chromatic dispersion compensators 300a–300b such that the first set 104c of channels output from output port 508a of the 2×2 channel separator 504 is subsequently input to the first chromatic dispersion compensator 300a, and the second set 104d of channels output from output port 508b of the 2×2 channel separator 504 is subsequently input to the second chromatic dispersion compensator 300b. The 2×2 channel separator 504 receives a first composite optical signal 104a comprising the channels $\lambda_1$–$\lambda_n$ and a second composite optical signal 104b comprising the channels $\lambda_1'$–$\lambda_n'$ from one or more fiber optic communications systems or lines at the input ports 506a and 506b respectively. The 2×2 channel separator 504 subsequently separates and recombines the channels such that the odd channels from the first composite optical signal 104a and the even channels from the second composite optical signal 104b are output from output 508a as the single composite optical signal 104c whilst the even channels from the first composite optical signal 104a and the odd channels from the second composite optical signal 104b are output from output port 508b as the single composite optical signal 104d. In operation of the system 570, the 2×2 channel separator 504 produces undesired chromatic dispersion within each one of the channels comprising the two composite optical signals 104c–104d. This undesired chromatic dispersion is then compensated by each of the chromatic dispersion compensators 300a–300b such that the channels comprising the composite optical signals 105c and 105d comprise substantially no residual chromatic dispersion upon being output from the system 570 to one or more fiber optic communication systems or lines.

In the system 500 (FIG. 5a), the system 550 (FIG. 5b) and the system 570 (FIG. 5c), the channel separator 504 may comprise the channel separator 400 illustrated in FIGS. 4a–4b. However, the channel separator 504 may comprise any channel separator and need not be limited to the particular structure of the channel separator 400. Various other examples of channel separators that utilize a non-linear interferometer and which may be utilized as the channel separator 504 are disclosed in the following co-pending U.S. patent applications, all assigned to the assignee of the present application: "Fiber Optic Wavelength Division Multiplexer With a Phase Differential Method of Wavelength Separation Utilizing Glass Blocks and a Nonlinear Interferometer", Ser. No. 09/248,021 now U.S. Pat. No. 6,215,926, filed Feb. 10, 1999; "Dense Wavelength Division Multiplexer Utilizing an Asymmetric Pass Band Interferometer", Ser. No. 09/388,350 now U.S. Pat. No. 6,310,690, filed Sep. 1, 1999; "High-Isolation Dense Wavelength Division Multiplexer Utilizing a Polarization Beam Splitter, Non-Linear Interferometers & Birefringent Plates", Ser. No. 09/348,752 now U.S. Pat. No. 6,263,129, filed Jul. 6, 1999; "High-Isolation Dense Wavelength Division Multiplexer Utilizing Birefringent Plates and a Non-Linear Interferometer", Ser. No. 09/404,005 now U.S. Pat. No. 6,560,015, filed Sep. 23, 1999; "Multi-Functional Optical Device Utilizing Multiple Polarization Beam Splitters and Non-Linear Interferometers", attorney docket no. 1790P, filed Aug. 2, 2000 and "Multi-Function Optical Device Utilizing Multiple Birefringent Plates and Non-Linear Interferometers", attorney docket no. 1791P, filed Aug. 24, 2000. All of these co-pending U.S. Patent Applications are incorporated herein in their entirety by reference.

The chromatic dispersion compensator in accordance with the present invention may also be utilized advantageously to compensate chromatic dispersion produced by a dense optical channel comb filter utilizing a non-linear interferometer. FIGS. 6a–7b illustrate example optical comb filters. FIGS. 8a–8b, respectively, illustrate a fourth and a fifth preferred embodiment of a system for compensating for chromatic dispersion in accordance with the present invention.

Figure 6A:
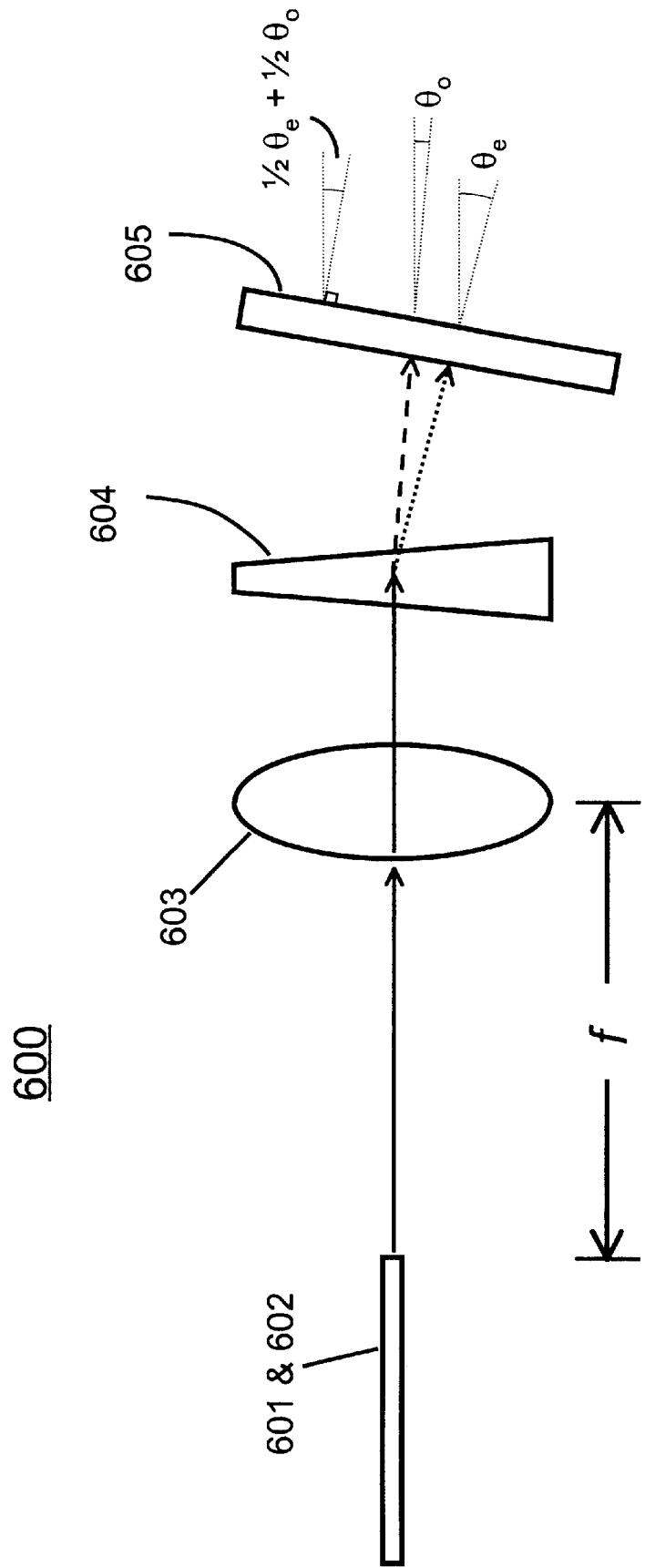
FIG. 6a illustrates a dense optical comb filter that utilizes a non-linear interferometer and a birefringent wedge.

FIG. 6a illustrates a side view of a dense optical channel comb filter that utilizes a birefringent wedge and a nonlinear interferometer. The dense optical channel comb filter 600 is described in more detail in a co-pending U.S. patent application assigned to the assignee of the present application, entitled "Dense Wavelength Division Multiplexer which Includes a Dense Optical Channel Comb Filter" Ser. No. 09/401,686 filed Sep. 23, 1999 now U.S. Pat. No. 6,205,270, which is incorporated herein by reference in its entirety. The comb filter 600 comprises two optical fibers 601 and 602 mounted in parallel and disposed side by side. Fiber 601 is used for signal input and fiber 602 is used for signal output. For geometric reference, the common axis of the two fibers 601 and 602 defines the axis of comb filter 600. The comb filter 600 also comprises a lens 603, a wedge-shaped plate 604 composed of a birefringent material such as calcite, rutile or lithium niobate, and a non-linear interferometer 605. The lens 603 is disposed such that it is centered on the comb filter axis at a distance from the end faces of input fiber 601 and output fiber 602 equivalent to its focal length, $f$. Also, the birefringent wedge 604 is disposed along the filter axis to the opposite side of the lens 603 from fibers 601 and 602 and the non-linear interferometer 605 is disposed to the opposite side of wedge 604 from lens 603. A major dimension of the non-linear interferometer 605 is oriented at an angle to the comb filter main axis. The non-linear interferometer 605 is constructed and operates similarly to that utilized in the channel separator 400 (FIG. 4a) and is described in detail in the aforementioned co-pending U.S. patent application "Nonlinear Interferometer for Fiber Optic Dense Wavelength Division Multiplexer Utilizing a Phase Differential Method of Wavelength Separation".

Figure 7A:
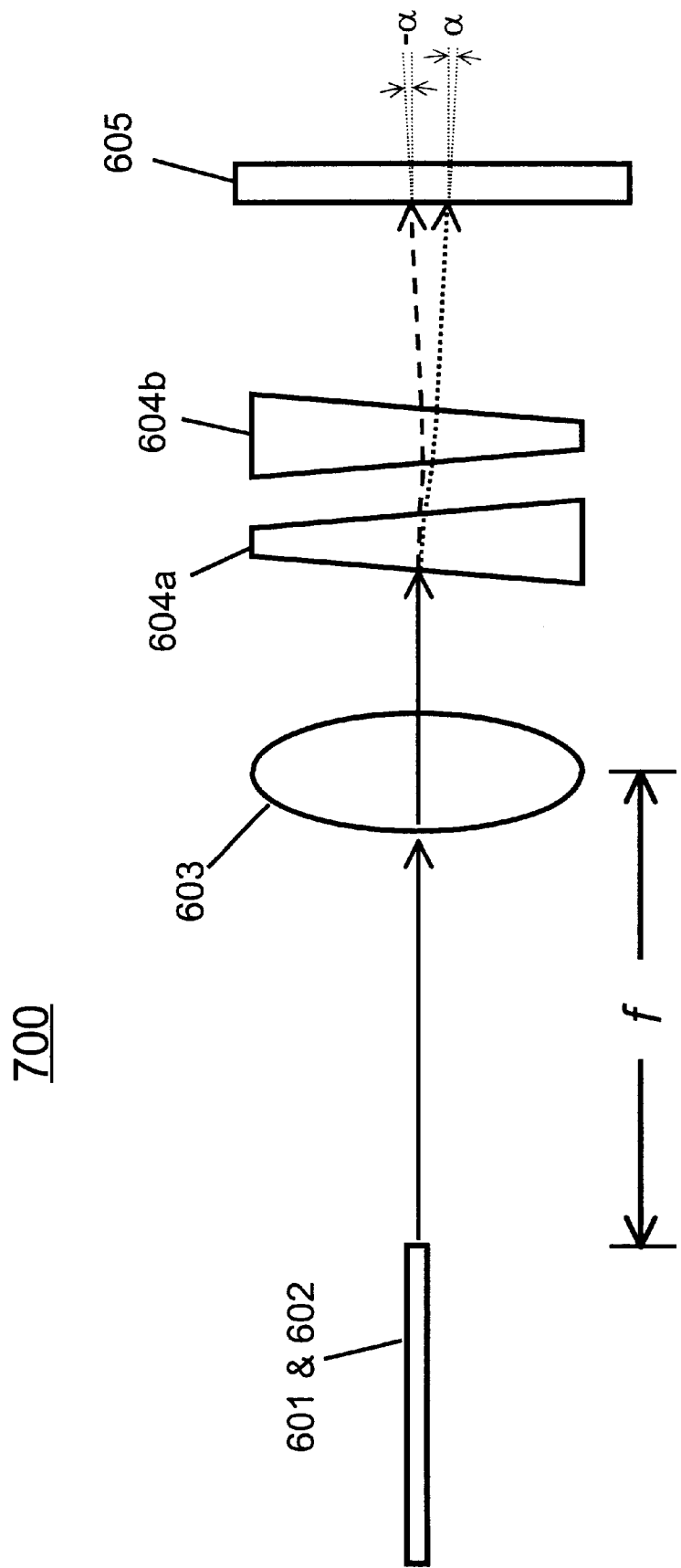
FIG. 7a illustrates another optical comb filter that utilizes a non-linear interferometer and a birefringent wedge.
Figure 8A:
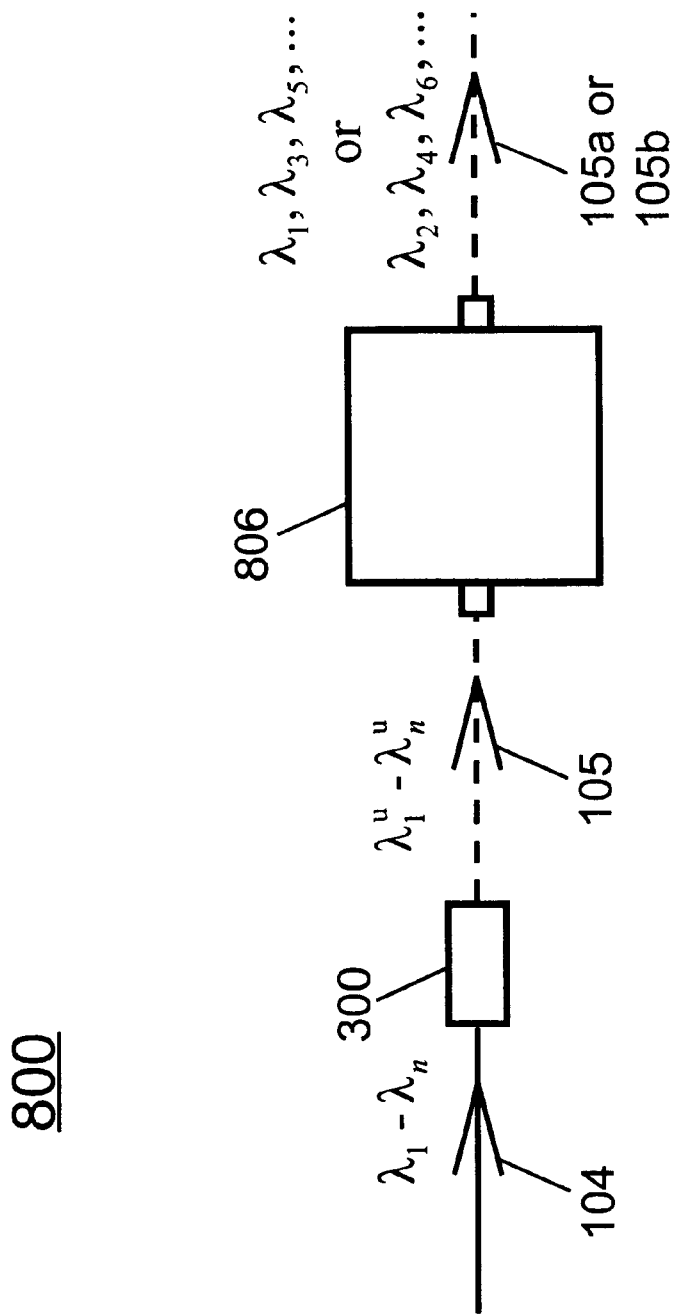
FIGS. 8a and 8b illustrate, respectively, a fourth and fifth preferred embodiments of a system for compensating for chromatic dispersion in accordance with the present invention.
Figure 8B:
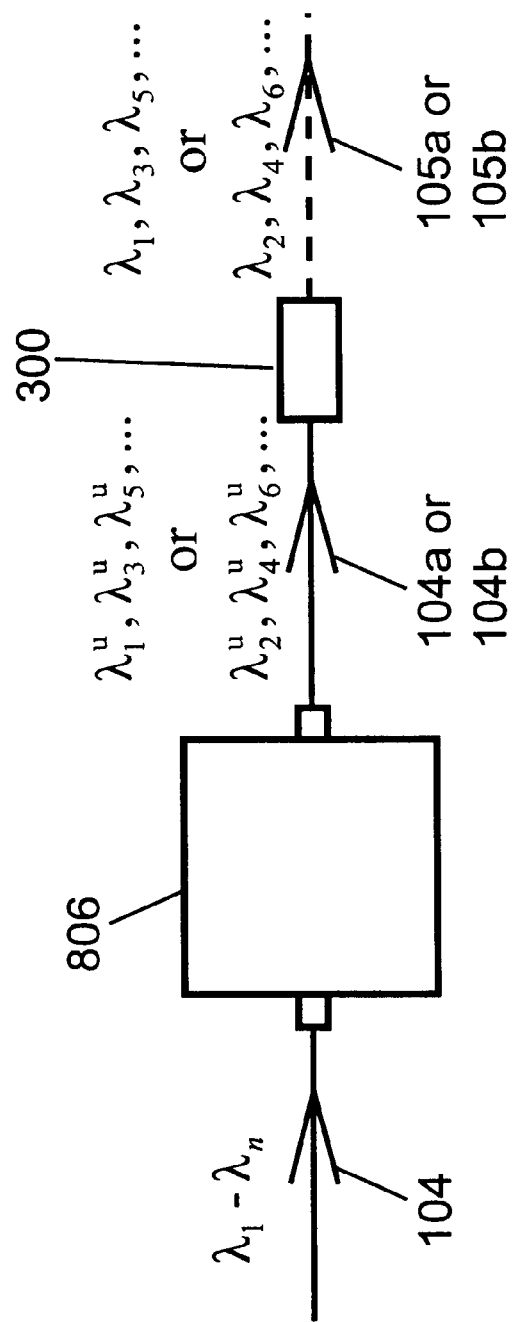

FIG. 7a illustrates another example of a dense optical channel comb filter that utilizes a non-linear interferometer. The dense optical channel comb filter 700 is described in more detail in a co-pending U.S. patent application assigned to the assignee of the present application entitled "Dense Wavelength Division Multiplexer which Includes a Dense Optical Channel Comb Filter" Ser. No. 09/574,650 now U.S. Pat. No. 6,393,176, filed May 18, 2000, which is incorporated herein by reference in its entirety. In the dense optical channel comb filter 700, the input and output fiber 601–602 and the lens 603 are disposed similarly to the respective similarly numbered components of comb filter 600 (FIG. 6a). However, in the comb filter 700, a first birefringent wedge 604a and a second birefringent wedge 604b replace the single birefringent wedge 604 of the dense optical channel comb filter 600 (FIG. 6a) and the non-linear interferometer 605 is not tilted with respect to an axis defined by the long dimension of the fibers. The shapes of the two birefringent wedges 604a–604b are identical to one another except that the second wedge 604b is inverted relative to the first wedge 604a. The respective optic axes of the birefringent wedges 604a–604b are disposed perpendicular to one another.

Figure 6B:
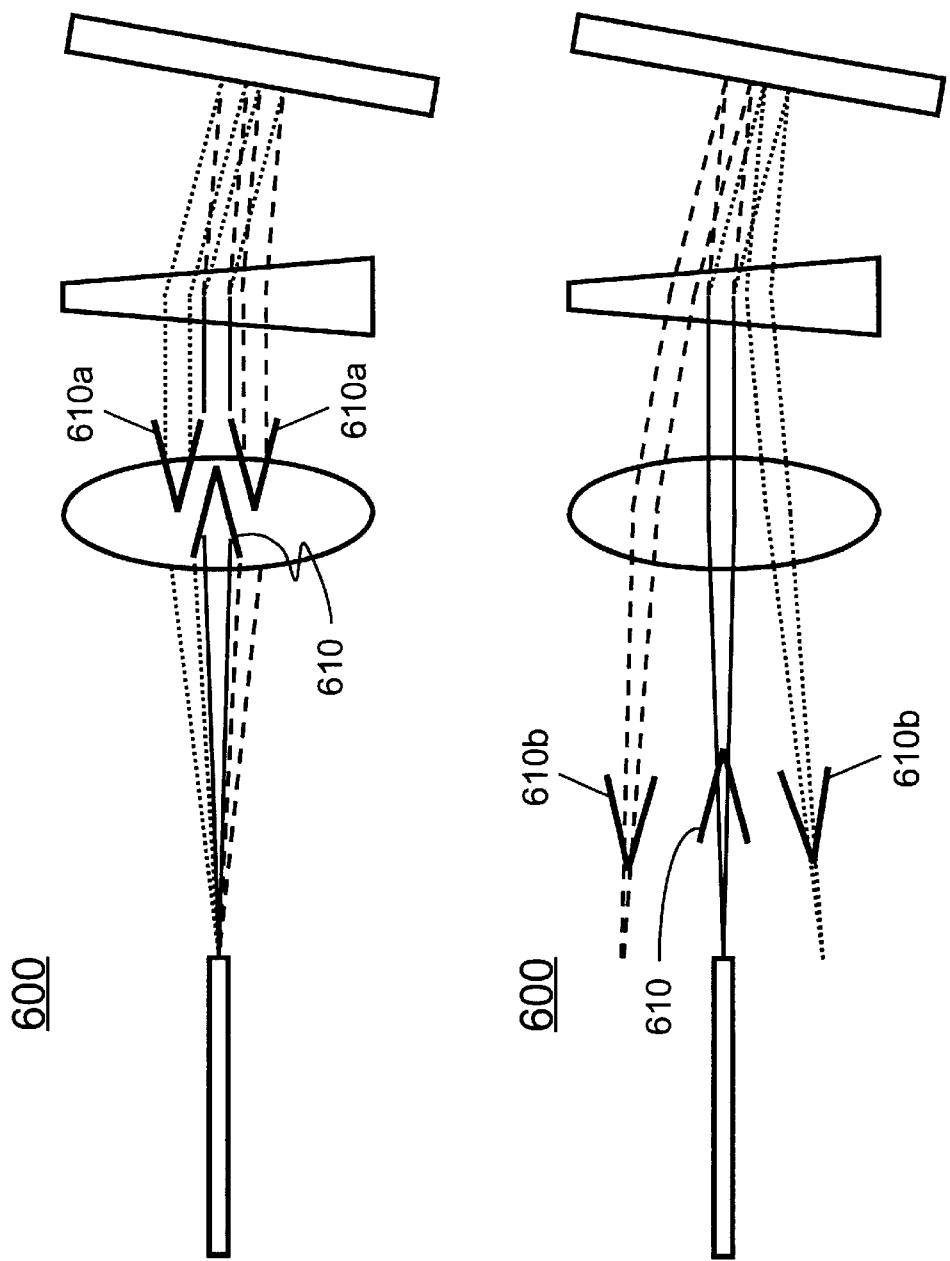
Figure 7B:
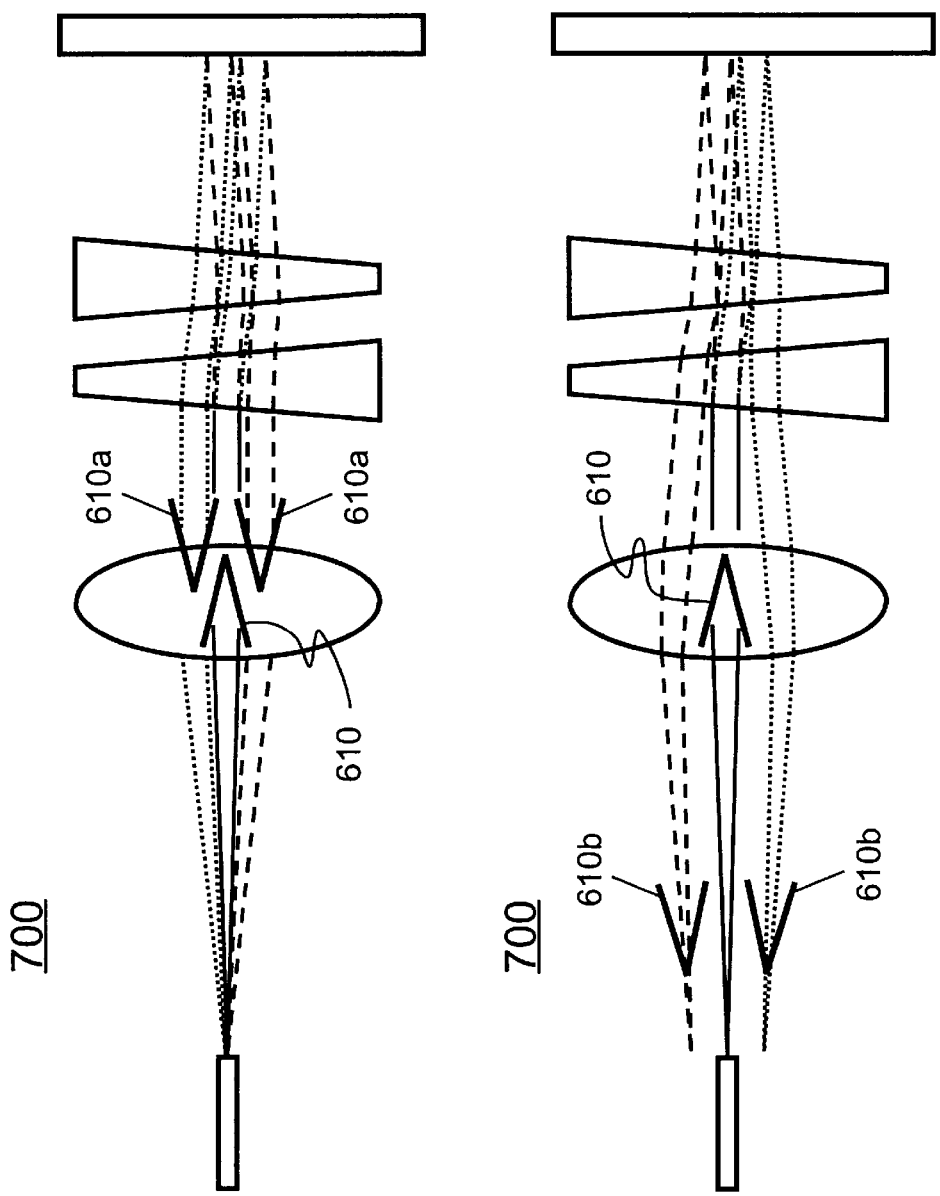

FIG. 6b and FIG. 7b illustrate the pathways of first and second sets of channels through the comb filter 600 and through the comb filter 700, respectively. In either of these figures, the upper drawing represents the pathways of a first set 610a of channels—either even or odd—that are transmitted through the respective apparatus whereas the lower drawing represents the pathways of a second set 610b of channels that are interleaved with the first set and that are not transmitted through the respective comb filters 600, 700. The input 610 to either comb filter 600 (FIG. 6b) or comb filter 700 (FIG. 7b) is a composite optical signal that may comprise both sets 610a–610b of channels. Further details of the operation of comb filter 600 and comb filter 700 are described in the aforementioned co-pending U.S. patent applications having Ser. No. 09/401,686 now U.S. Pat. No. 6,205,270, and Ser. No. 09/574,650 now U.S. Pat. No. 6,393,176 respectively.

FIGS. 8a–8b, respectively, illustrate a fourth and a fifth preferred embodiment of a system for compensating for chromatic dispersion in accordance with the present invention. In systems 800 (FIG. 8a) and 850 (FIG. 8b), the chromatic dispersion for a dense optical channel comb filter is compensated. In the system 800 (FIG. 8a), a chromatic dispersion compensator 300 and a dense optical channel comb filter 806 are optically coupled in sequence such that the output of the chromatic dispersion compensator 300 is subsequently input to the dense optical channel comb filter 806. The dense optical channel comb filter 806 may comprise either the comb filter 600 (FIG. 6a) or the comb filter 700 (FIG. 7a). The chromatic dispersion compensator 300 adds chromatic dispersion to each of the channels of a composite optical signal 104 that is input from a fiber optic communications system or line. The composite optical signal 105 comprises this added chromatic dispersion and is output from the chromatic dispersion compensator 300 and subsequently input to the dense optical channel comb filter 806. The dense optical channel comb filter 806 produces additional chromatic dispersion within each one of the channels comprising the outputs. The chromatic dispersion compensator 300 of system 800 is configured such that the chromatic dispersion produced by the dense optical channel comb filter 806 substantially cancels the chromatic dispersion previously produced by the chromatic dispersion compensator 300. Therefore, the channels comprising the output of the dense optical channel comb filter 806 exhibit substantially no chromatic dispersion upon output from the system 800. The output of comb filter 806 either comprises the set 105a of odd channels or the set 105b of even channels. The system 850 (FIG. 8b) is similar to the system 800 (FIG. 8a) except that the relative positions of the dense optical channel comb filter 806 and the chromatic dispersion compensator 300 are reversed.

Figure 9:
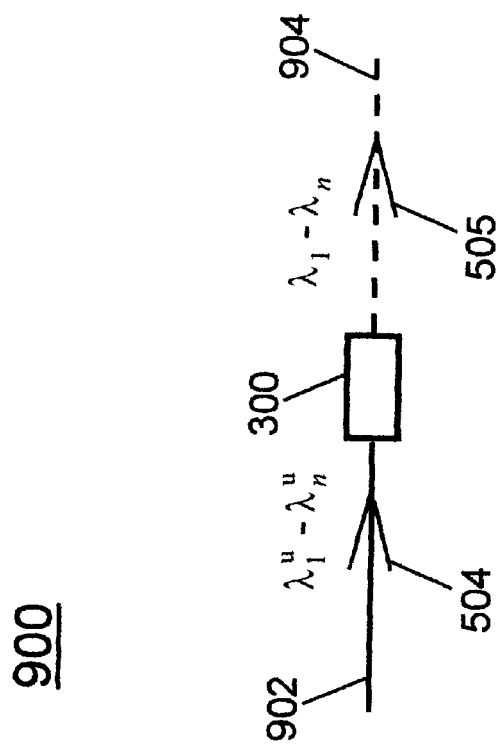
FIG. 9 illustrates a sixth preferred embodiment of a system for compensating for chromatic dispersion in accordance with the present invention.

Finally, FIG. 9 illustrates a sixth preferred embodiment of a system for compensating for chromatic dispersion in accordance with the present invention. In the system 900 (FIG. 9), a first fiber optic communications system or line 902 is optically coupled to the input of a chromatic dispersion compensator 300 and a second fiber optic communications system or line 904 is optically coupled to the output of the chromatic dispersion compensator 300. A composite optical signal 504 comprising the n optical channels $\lambda_1^u - \lambda_n^u$, wherein all such channels comprise an approximately equivalent amount of undesired chromatic dispersion, is input to the chromatic dispersion compensator 300 via the first fiber optic communications system or line 902. The undesired chromatic dispersion of the channels $\lambda_1^u - \lambda_n^u$ may result from optical components and/or from optical fiber within the communications system of line 902. The chromatic dispersion compensator 300 produces compensatory chromatic dispersion within each of the optical channels, as previously described. The resulting composite optical signal 505, comprising the n dispersion-compensated channels $\lambda_1 - \lambda_n$ is then output to the second fiber optic communications system or line 904.

An improved chromatic dispersion compensator have been disclosed. In a preferred embodiment, the chromatic dispersion compensator comprises an input optical fiber, an output optical fiber, a collimator optically coupled to the input and output optical fibers, and a Gires-Tournois interferometer optically coupled to the collimator at a side opposite to the input and output optical fibers. A plurality of sequentially optically coupled chromatic dispersion compensators may also be used. The compensator in accordance with the present invention provides flexibility in producing periodically varying chromatic dispersion so as to compensate for unwanted periodic chromatic dispersion produced in an interferometric interleaved channel separator. Also, the compensator enables compensation of fiber optic chromatic dispersion.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for compensating for chromatic dispersion of an optical signal, comprising the steps of:
   (a) receiving the optical signal from an input fiber;
   (b) collimating the optical signal using a collimator;
   (c) delivering the collimated optical signal to a Gires-Tournois interferometer;
   (d) reflecting a chromatic-dispersion-compensated optical signal from the Gires-Tournois interferometer to the collimator;
   (e) focusing the chromatic-dispersion compensated optical signal into an output fiber.

2. The method of claim 1, wherein the Gires-Tournois interferometer comprises:
   a first glass plate optically coupled to the collimator at a side opposite to the input and output optical fibers;
   a second glass plate optically coupled to the first glass plate at a side opposite to the collimator;
   at least one spacer coupled to the first and second glass plates, forming a cavity; a first reflective surface coupled to the first glass plate on a face inside the cavity; and a second reflective surface coupled to the second glass plate on a face inside the cavity.

3. The method of claim 2, wherein the Gires-Tournois interferometer further comprises:
   an optical length adjustment element residing inside the cavity and optically coupled to the first and second reflective surfaces, wherein the optical length adjustment element may be tilted at an angle with respect to the first and second reflective surfaces.

4. The method of claim 3, wherein the angle of the optical length adjustment element provides a periodicity to a chromatic dispersion of the Gires-Tournois interferometer.

5. The method of claim 3, wherein the angle of the optical length adjustment element is adjustable.

6. The method of claim 2, wherein a length of the at least one spacer provides a desired periodicity to a chromatic dispersion of the Gires-Tournois interferometer.

7. The method of claim 2, wherein the first reflective surface has a reflectivity of less than 100%.

8. The method of claim 2, wherein the second reflective surface has a reflectivity of approximately 100%.

9. The method of claim 2, wherein the Gires-Tournois interferometer further comprises:
   a piezoelectric element coupled between the second reflective surface and the second glass plate, wherein a thickness of the piezoelectric element is variable.

10. A method for compensating for chromatic dispersion of an optical signal, comprising the steps of:
    (a) delivering the optical signal from an input fiber to a first compensator of a plurality of optically coupled compensators;
    (b) providing partial dispersion compensation to the optical signal using the first compensator;
    (c) directing the optical signal to the next compensator of the plurality of compensators utilizing one of a plurality of optical couplings, wherein the plurality of optical couplings sequentially optically couples the plurality of compensators;
    (d) providing partial dispersion compensation to the optical signal using the next compensator of the plurality of compensators;
    (e) repeating steps (c) and (d) until the optical signal exits the last compensator of the plurality of compensators.

11. The method of claim 10, wherein one of the plurality of compensators comprises:
    an input optical fiber;
    an output optical fiber;
    a collimator optical coupled to the input and output fiber; and
    an interferometer optically coupled to the collimator at a side opposite to the input and output fibers.

12. The method of claim 11, wherein the interferometer is a Gires-Tournois interferometer, wherein the Gires-Tournois interferometer comprises:
    a first glass plate optically coupled to the collimator at a side opposite to the input and output optical fibers;
    a second glass plate optically coupled to the first glass plate at a side opposite to the collimator;
    at least one spacer coupled to the first and second glass plates, forming a cavity;
    a first reflective surface coupled to the first glass plate on a face inside the cavity; and
    a second reflective surface coupled to the second glass plate on a face inside the cavity.

13. The method of claim 12, wherein the Gires-Tournois interferometer further comprises:
    an optical length adjustment element residing inside the cavity and optically coupled to the first and second reflective surfaces, wherein the optical length adjustment element may be tilted at an angle with respect to the first and second reflective surfaces.

14. The method of claim 13, wherein the angle of the optical length adjustment element provides a periodicity to a chromatic dispersion of the Gires-Tournois interferometer.

15. The method of claim 12, wherein a length of the at least one spacer provides a desired periodicity to a chromatic dispersion of the Gires-Tournois interferometer.

16. The method of claim 12, wherein the first-reflective surface has a reflectivity of less than 100%.

17. The method of claim 12, wherein the second reflective surface has a reflectivity of approximately 100%.

18. The method of claim 13, wherein the angle of the optical length adjustment element is adjustable.

19. The method of claim 12, wherein the Gires-Tournois interferometer further comprises:
    a piezoelectric element coupled between the second reflective surface and the second glass plate, wherein a thickness of the piezoelectric element is variable.

20. The method of claim 11, wherein the input and output optical fibers are approximately equidistant from a main axis of the compensator.

21. The method of claim 11, wherein the collimator comprises a lens.

22. The method of claim 11, wherein the interferometer of a first one of the plurality of compensators is a first Gires-Tournois interferometer, wherein the interferometer of a second one of the plurality of compensators is a second Gires-Tournois interferometer, wherein an operational parameter varies between the first Gires-Tournois interferometer and the second Gires-Tournois interferometer.

\* \* \* \* \*